US011255231B2

(12) United States Patent
Fuhrman et al.

(10) Patent No.: US 11,255,231 B2
(45) Date of Patent: Feb. 22, 2022

(54) PRESSURIZED OIL SYSTEM POWERED BY TWO-STROKE ENGINE

(71) Applicant: Arctic Cat Inc., Thief River Falls, MN (US)

(72) Inventors: Alexander Konrad Fuhrman, Thief River Falls, MN (US); Ryan Douglas Hayes, Warren, MN (US); Andrew Jon Ellsworth, Thief River Falls, MN (US); Cord Miller Christensen, Goodridge, MN (US); David Mark Sabo, Thief River Falls, MN (US); Derek Robert Kvenvold, Thief River Falls, MN (US)

(73) Assignee: Arctic Cat, Inc., Thief River Falls, MN (US)

( * ) Notice: Subject to any disclaimer, the term of this patent is extended or adjusted under 35 U.S.C. 154(b) by 762 days.

(21) Appl. No.: 16/103,718

(22) Filed: Aug. 14, 2018

(65) Prior Publication Data

US 2019/0055862 A1    Feb. 21, 2019

Related U.S. Application Data

(60) Provisional application No. 62/545,824, filed on Aug. 15, 2017.

(51) Int. Cl.
*F01M 1/02* (2006.01)
*F01M 11/00* (2006.01)
(Continued)

(52) U.S. Cl.
CPC .............. *F01M 1/02* (2013.01); *B62M 27/02* (2013.01); *F01M 11/0004* (2013.01); *F01P 1/02* (2013.01);
(Continued)

(58) Field of Classification Search
CPC ................. F01M 1/02; F01M 11/0004; F01M 2001/0238; F01M 2001/0269;
(Continued)

(56) References Cited

U.S. PATENT DOCUMENTS

| 3,726,084 A | 4/1973 | Meier et al. |
| 4,285,200 A | 8/1981 | Byrne et al. |

(Continued)

FOREIGN PATENT DOCUMENTS

| EP | 2196641 B1 | 6/2010 |
| JP | 59176419 A | 10/1984 |

(Continued)

OTHER PUBLICATIONS

Push Turbo, http://www.pushturbo.com/home/arctic-cat-section/arctic-cat-800-turbo-kit-8000-2/, last viewed Aug. 14, 2018.
(Continued)

*Primary Examiner* — Jacob M Amick
(74) *Attorney, Agent, or Firm* — Billion & Armitage

(57) ABSTRACT

A two-stroke engine comprises a first oiling system and a second oiling system. The first oiling system includes a low-pressure pump that distributes oil from a first oil tank to the two-stroke engine. The second oiling system includes a pump mechanically coupled to a crankshaft of the two-stroke engine, wherein the pump distributes oil from a second oil tank to an accessory at a pressure greater than the first oil pressure, wherein oil distributed to the accessory is returned to the second oil tank.

20 Claims, 26 Drawing Sheets

(51) Int. Cl.
*B62M 27/02* (2006.01)
*F01P 3/20* (2006.01)
*F01P 1/02* (2006.01)
*F02B 75/02* (2006.01)
*F01P 11/02* (2006.01)
*F01M 1/12* (2006.01)

(52) U.S. Cl.
CPC ............... *F01P 3/20* (2013.01); *F02B 75/02* (2013.01); *F01M 2001/023* (2013.01); *F01M 2001/0238* (2013.01); *F01M 2001/0269* (2013.01); *F01M 2001/123* (2013.01); *F01M 2011/0095* (2013.01); *F01P 11/029* (2013.01); *F01P 2001/023* (2013.01); *F01P 2050/16* (2013.01); *F01P 2060/02* (2013.01); *F01P 2060/04* (2013.01); *F01P 2060/12* (2013.01); *F02B 2075/025* (2013.01)

(58) Field of Classification Search
CPC ..... F01M 2001/123; F01M 2011/0095; B62M 27/02; F01P 1/02; F01P 3/20; F01P 2060/12; F01P 2060/02
See application file for complete search history.

(56) References Cited

U.S. PATENT DOCUMENTS

| | | | |
|---|---|---|---|
| 4,512,292 A | 4/1985 | Hundertmark et al. | |
| 4,702,079 A | 10/1987 | Saito et al. | |
| 6,561,297 B2 | 5/2003 | Yatagai et al. | |
| 6,651,765 B1 | 11/2003 | Weinzierl | |
| 7,104,352 B2 | 9/2006 | Weinzierl et al. | |
| 7,159,680 B2 | 1/2007 | Pichler et al. | |
| 7,264,075 B2 | 9/2007 | Schuemacher et al. | |
| 7,497,292 B2 | 3/2009 | Yatagai et al. | |
| 8,011,342 B2 | 9/2011 | Bluhm | |
| 8,459,392 B2 | 6/2013 | Bernier et al. | |
| 2004/0109759 A1 | 6/2004 | Korner | |
| 2008/0142287 A1* | 6/2008 | Simmons | B62M 27/02 180/186 |
| 2009/0250281 A1 | 10/2009 | Weinzierl | |
| 2012/0291747 A1 | 11/2012 | Jurjevec et al. | |
| 2017/0122230 A1* | 5/2017 | Bhattacharya | F02B 39/16 |
| 2017/0211572 A1* | 7/2017 | Jeong | F04C 2/102 |
| 2017/0219085 A1* | 8/2017 | Kiyokami | F01M 1/02 |
| 2017/0241326 A1 | 8/2017 | Vezina et al. | |
| 2018/0215446 A1 | 8/2018 | Foxhall et al. | |

FOREIGN PATENT DOCUMENTS

| | | |
|---|---|---|
| WO | 2009/114414 A1 | 9/2009 |
| WO | 2010/105620 A1 | 9/2010 |
| WO | 2016/038419 | 3/2016 |

OTHER PUBLICATIONS

Arcticinsider, "Everything You Wanted to know about the Arctic Cat C-TEC2 8000 Engine", Jan. 24, 2017, 11 pages.

* cited by examiner

PRESSURIZED OIL SYSTEM POWERED BY TWO-STROKE ENGINE

CROSS-REFERENCE TO RELATED TO APPLICATION(S)

This application claims benefit of U.S. Provisional Application No. 62/545,824, filed on Aug. 15, 2017 and which application is incorporated herein by reference. A claim of priority is made.

TECHNICAL FIELD

This invention relates generally to oil distribution systems, and in particular to pressurized oiling systems powered by two-stroke engines.

BACKGROUND

Two-stroke engines are commonly employed in recreational vehicles, such as snow vehicles, all-terrain vehicles (ATVs), side-by-side vehicles, and others, due to the simplicity of design, power, and efficiency as compared with four-stroke engines. Most two-stroke engines rely on an oiling system in which oil is mixed with the fuel and/or the oil is injected (e.g., into the crankcase) but not returned to the oil pump, resulting in the oil being combusted along with the fuel and expelled as exhaust. As a result, this type of oiling system is referred to as a total-loss system, as the oil provided to the engine is lost.

Although the design is relatively simple, the oil pressure made available in a total-loss oiling system is relatively low (e.g., less than 10 PSI). While fine for lubrication of the two-stroke engine, this oil pressure is insufficient to properly lubricate other accessories and/or provide power (e.g., hydraulic). It would therefore be beneficial to develop an oiling system for use in conjunction with two-stroke engines that provides the desired oil pressure and/or flow rate.

SUMMARY

In some embodiments, a two-stroke engine includes a first oil distribution system and a second oil distribution system. The first oil distribution system includes a first pump that distributes oil from a first oil tank to the two-stroke engine at a first oil pressure. The second oil distribution system includes a second pump mechanically coupled to a crankshaft of the two-stroke engine to distribute oil from the second oil tank to an accessory at a second oil pressure, wherein the second oil pressure is higher than the first oil pressure, and wherein oil distributed to the accessory is returned to the second oil tank.

In some embodiments, a snow vehicle comprises an endless track, a frame, a transmission, and a two-stroke engine mechanically coupled to drive the endless track via the transmission. The two-stroke engine further comprises a first oiling system and a second oiling system. The first oiling system pumps oil from a first oil tank to the two-stroke engine at a first oil pressure. The second oiling system includes a pump mechanically coupled to a crankshaft of the two-stroke engine, wherein the pump is fluidly connected to pump oil from a second oil tank to one or more accessories at a second oil pressure, and wherein the second oil pressure is greater than the first oil pressure. Oil distributed to the one or more accessories is returned to the second oil tank.

In some embodiments, a snowmobile comprises an endless track, a frame, a transmission, and a two-stroke engine mechanically coupled to drive the endless track via the transmission. The two-stroke engine includes an open-loop oiling system, an accessory, and a closed loop oiling system. The open-loop oiling system distributes oil from a first oil tank to the two-stroke engine at a first oil pressure. The closed loop oiling system includes a pump mechanically coupled to a crankshaft of the two-stroke engine to distribute oil from a second oil tank to the accessory at a second oil pressure, wherein oil distributed to the accessory is returned to the second oil tank.

DETAILED DESCRIPTION

Figure 1:
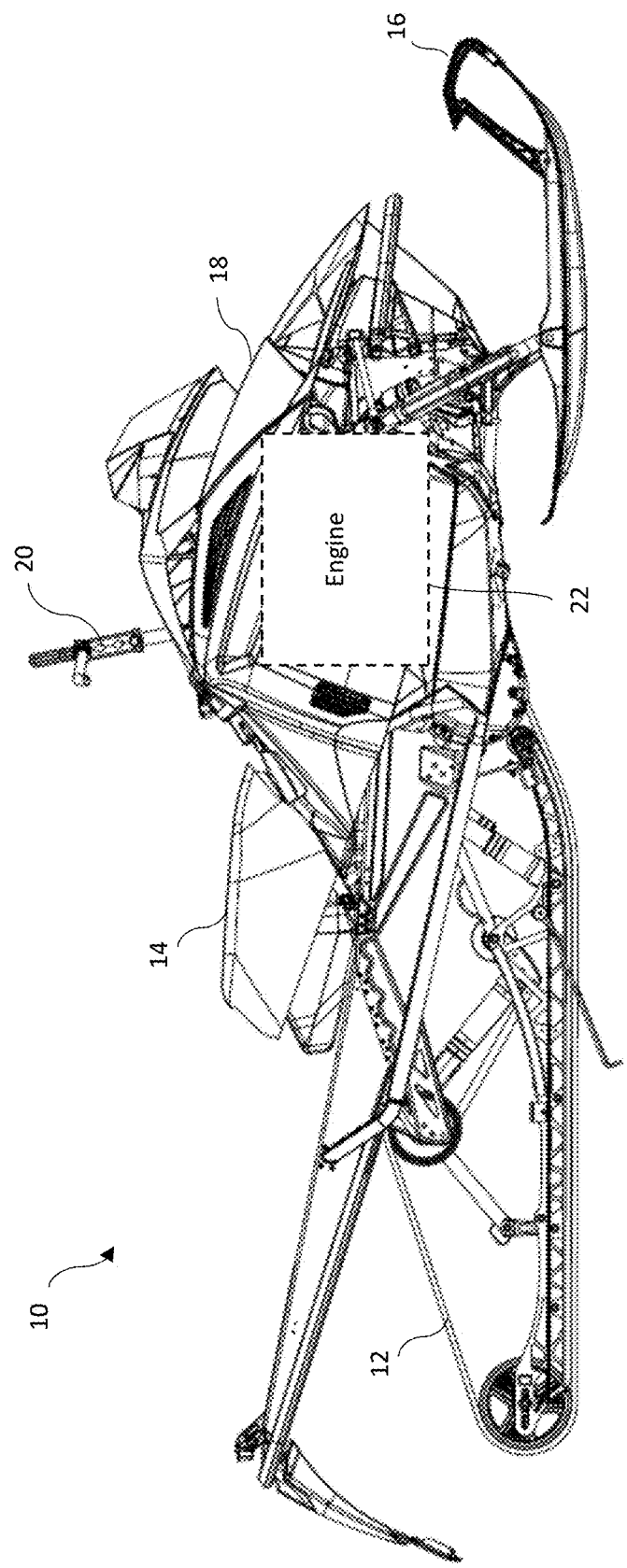
FIG. 1 is a side view of a snow vehicle according to one embodiment.

Referring to FIG. 1, a side view of a snow vehicle 10 is illustrated. In this embodiment, snow vehicle 10 is a snowmobile that includes track 12, seat 14, one or more skis 16, hood 18, handlebars 20 and engine 22 (obscured by hood 18). As discussed in more detail below, engine 22 includes a first oiling system and a second oiling system. In some embodiments, the first oiling system is a total loss oiling system utilized to lubricate engine 22. In some embodiments, the second oiling system is a pressurized, closed-loop oiling system utilized to provide lubrication to one or more accessories, which may be associated with engine 22. The second oiling system includes at least one pump, mechanically coupled to the engine 22 to provide the desired oil pressure—typically greater than that provided in the first oiling system. Utilizing a second oiling system, distinct from the first oiling system, allows engine 22 to make use of one or more accessories—such as turbocharger(s)—utilizing higher oil pressure than the available in the two-stroke engine relying on a total loss oiling system.

Figure 2:
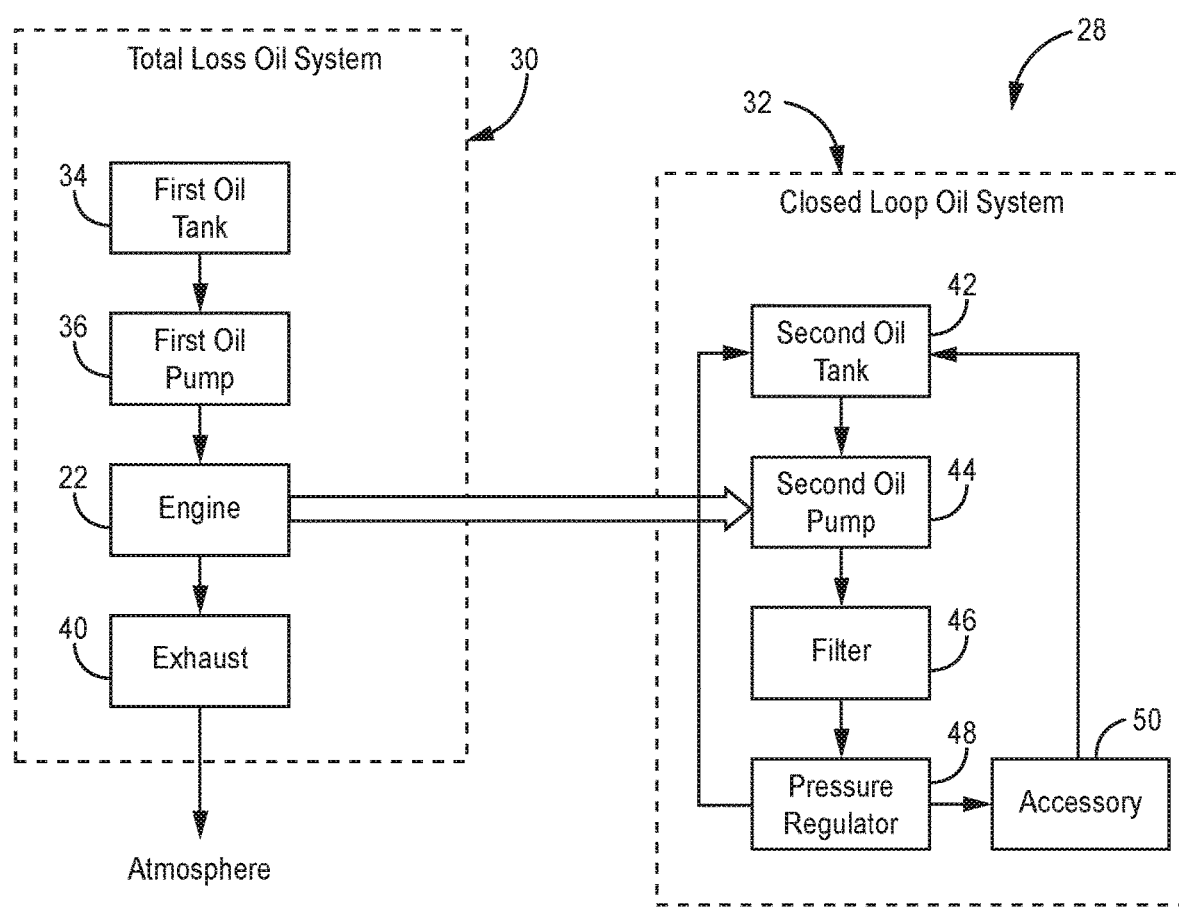
FIG. 2 is a block diagram of an oil distribution system that includes a first total-loss oiling system and a closed-loop oiling system according to one embodiment.

Referring now to FIG. 2, a block diagram of an oil distribution system 28 is shown that includes a first oiling system 30 and a second oiling system 32. In the embodiment shown in FIG. 2, first oiling system 30 includes first oil tank 34, first oil pump 36, two-stroke engine 22, and exhaust 40. Second oiling system 32 comprises second oil tank 42, second oil pump 44, filter (optional) 46, pressure regulator 48 and accessory 50. In this embodiment, first oiling system 30 is a total-loss system, in which oil provided to lubricate components of engine 22 is eventually combusted and dispelled into the atmosphere via exhaust 40. In particular, oil stored in first oil tank 34 is provided by one or more oil pumps 36 to two-stroke engine 22. The oil provided by oil pump(s) 36 is relatively low-pressure, which may be mixed with fuel and/or air and introduced in the cylinder(s), in the crankcase, or in both the cylinders and the crankcase. Oil provided by first oiling system 30 may be inadequate to properly lubricate one or more other accessories, such as a turbocharger.

In order to provide oil at a relatively higher oil pressure than that of the total-loss oiling system, a second oiling system 32 is provided. In some embodiments, the second oiling system 32 provides oil at a flow rate and/or pressure higher than that of the first oiling system 30. Oil pressure in the second oiling system 32 is developed by pump 44, which is mechanically coupled to the engine 22. In this way, although engine 22 is lubricated using a traditional total-loss oiling system, mechanical power provided by the engine is utilized to develop the oil pressure necessary for lubricating one or more accessories 122, such as one or more turbochargers and/or a high-pressure direct injection (HPDI) pressure pump assembly. In some embodiments, the second oiling system 32 provides oil to lubricate a cam lobe of an HPDI pressure pump assembly.

In the embodiment shown in FIG. 2, pump 44 is mechanically coupled to engine 22, and more particularly to the crankshaft (not shown in this view) of engine 22. Mechanical power generated by two-stroke engine 22 is utilized to drive pump 44. In contrast with the first oiling system 30, which provides oil at relatively low pressures to two-stroke engine 22 (e.g., less than 10 pounds per square inch (PSI)), the mechanical coupling of pump 44 to two-stroke engine 22 allows oil provided by pump 44 to be provided at higher pressures (e.g., greater than 10 PSI). In some embodiments, pressurized oil is filtered by filter 46 and regulated to a desired pressure by pressure regulator 48, wherein oil may be returned to second oil tank 42 from pressure regulator 48 if the pressure exceeds a desired pressure. As discussed below, some embodiments the respective locations of filter 46 and pressure regulator 48 may be modified—for example, by placing the pressure regulator 48 upstream of filter 46. Pressurized oil is fluidly communicated to one or more accessories 50 to lubricate the one or more accessories. In some embodiments, either in conjunction with or independent of utilizing the pressurized oil provided by second oiling system 32 for lubrication, the pressurized oil is utilized to provide hydraulic power to one or more components, and the oil is then returned to second oil tank 42. In some embodiments, oil provided to accessory 50 returns to second oil tank 42 simply due to gravity. In other embodiments, a secondary pump or 2 stage pump assembly (e.g., scavenge pump) may be utilized to pump oil utilized by accessory 50 to second oil tank 42. As described below (for example, with respect to FIG. 13), the scavenge pump may similarly be mechanically coupled to the engine 22, such that mechanical power generated by the two-stroke engine 22 is utilized to drive the scavenge pump. In some embodiments, one or both of the oiling systems (first oiling system 30 and second oiling system 32) includes an oil cooler to cool the oil.

The oil pressure provided by second oiling system 32 to accessory 50 may vary in some embodiments based on the engine RPM and/or engine load. In some embodiments, pressurized oil provided to accessory 50—under most operating conditions—has a pressure greater than that provided by first oiling system 30. In some embodiments, pressurized oil provided to accessory 50 may vary based on engine RPMs and/or engine load, but while the engine is running will provide an oil pressure that exceeds 10 PSI and, in some embodiments exceeding 20 PSI, 30 PSI, or 40 PSI. In some embodiments, the oil pressure generated by pump 44 and/or regulated by pressure regulator 48 is selected to satisfy the particular requirements of accessory 50. For example, in embodiments in which accessory 50 is a turbocharger, pressure provided may be greater than 10 PSI, 20 PSI, 30 PSI, and, in some embodiments, greater than 40 PSI. In this way, the second oiling system provides pressurized oil to one or more accessories. One of the benefits of this arrangement, in addition to the higher pressure provided by the second oiling system 32, is the ability to utilize oil in the second oil tank 42 having a composition selected specifically for lubricating the one or more accessories. That is, because oil utilized in first oiling system 30 is separate from the oil utilized in second oiling system 32, each can utilize a type of oil selected specifically for the particular application (e.g., first oil tank 34 may be comprised of oil selected to lubricate a two-stroke engine 22, while second oil tank 42 may be comprised of oil selected to lubricate the attached accessory 50). In some embodiments, the oil selected to lubricate the two-stroke engine 22 has a first viscosity or first range of viscosities, for example if it is a multi-viscosity oil. And, in some embodiments, the oil selected to lubricate (or power) the attached accessory 50 may have a second viscosity or second range of viscosities, for example if it is multi-viscosity oil. In some embodiments, the first viscosity (or first range of viscosities) is different than the second viscosity (or second range of viscosities). Further, in some embodiments, the oil selected to lubricate the two-stroke engine 22 may have different additives than the oil selected to lubricate (or power) the attached accessory 50. In some embodiments, first oil tank 34 and/or second oil tank 42 are closed, but in other embodiments, first oil tank 34 and/or second oil tank 42 are vented.

Figure 3:
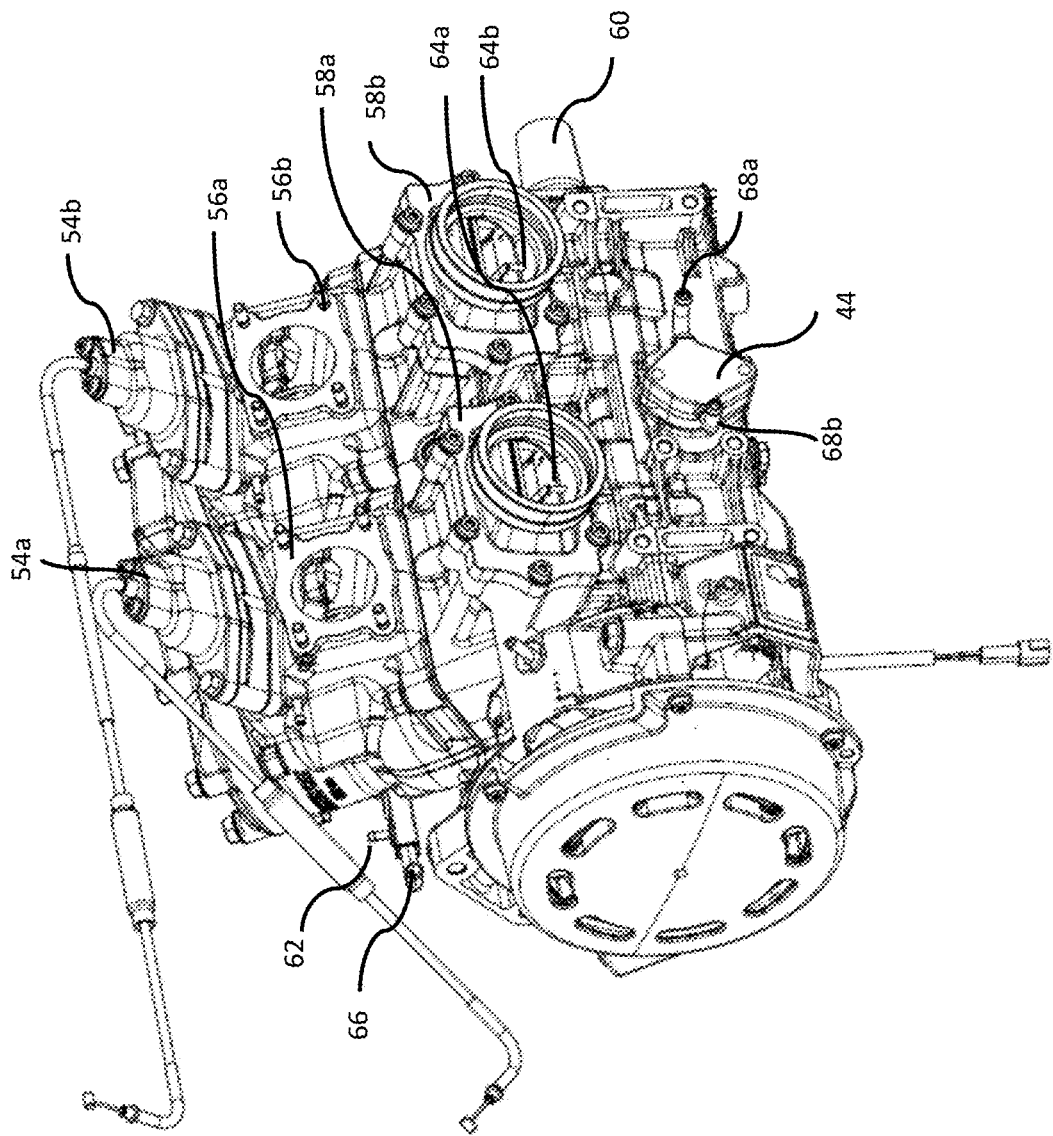
FIG. 3 is a perspective view of a two-stroke engine and oil pump utilized in the closed-loop oiling system according to one embodiment.
Figure 4:
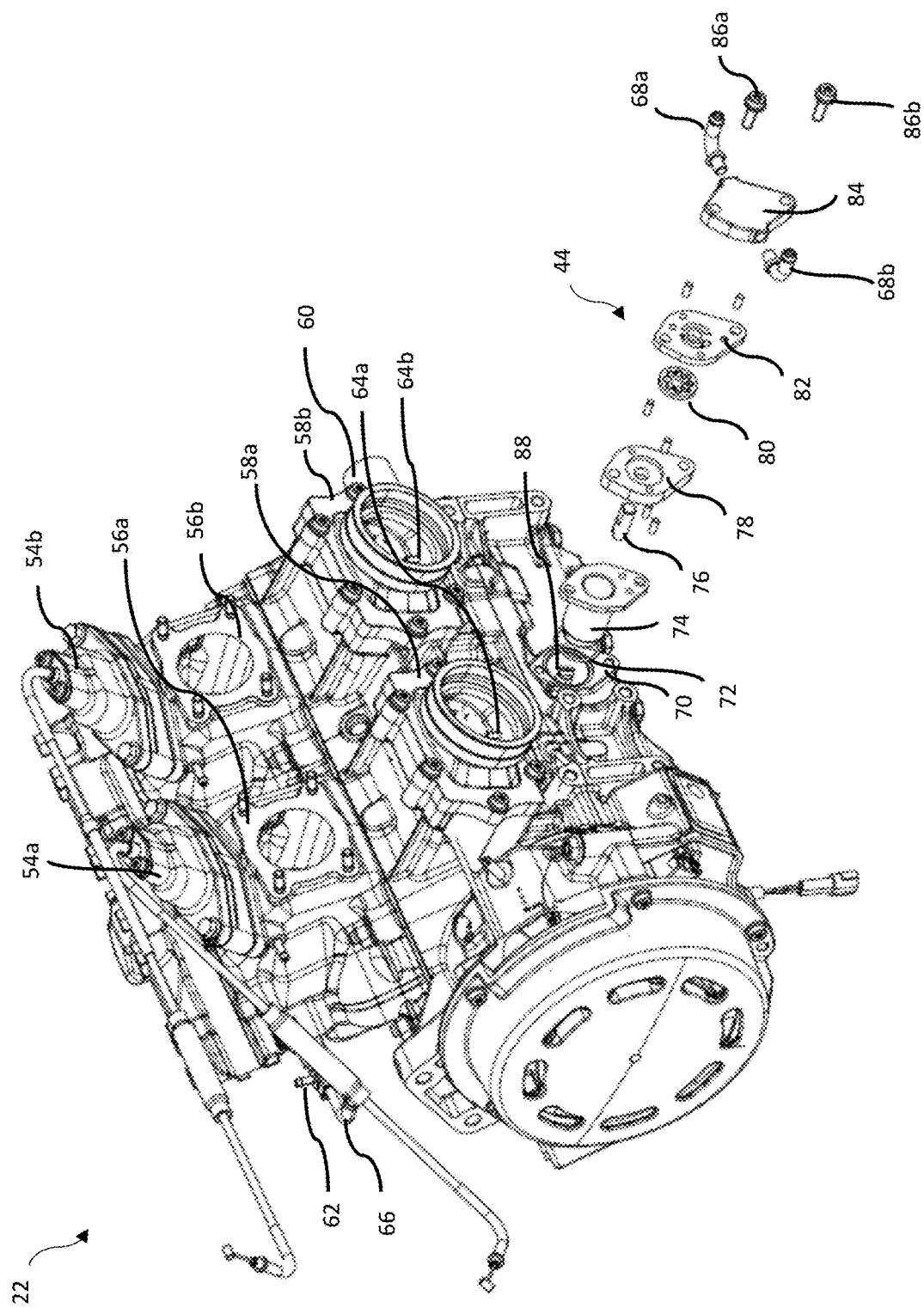
FIG. 4 is a perspective view of a two-stroke engine and exploded view of the oil pump utilized in the closed-loop oiling system according to one embodiment.
Figure 5:
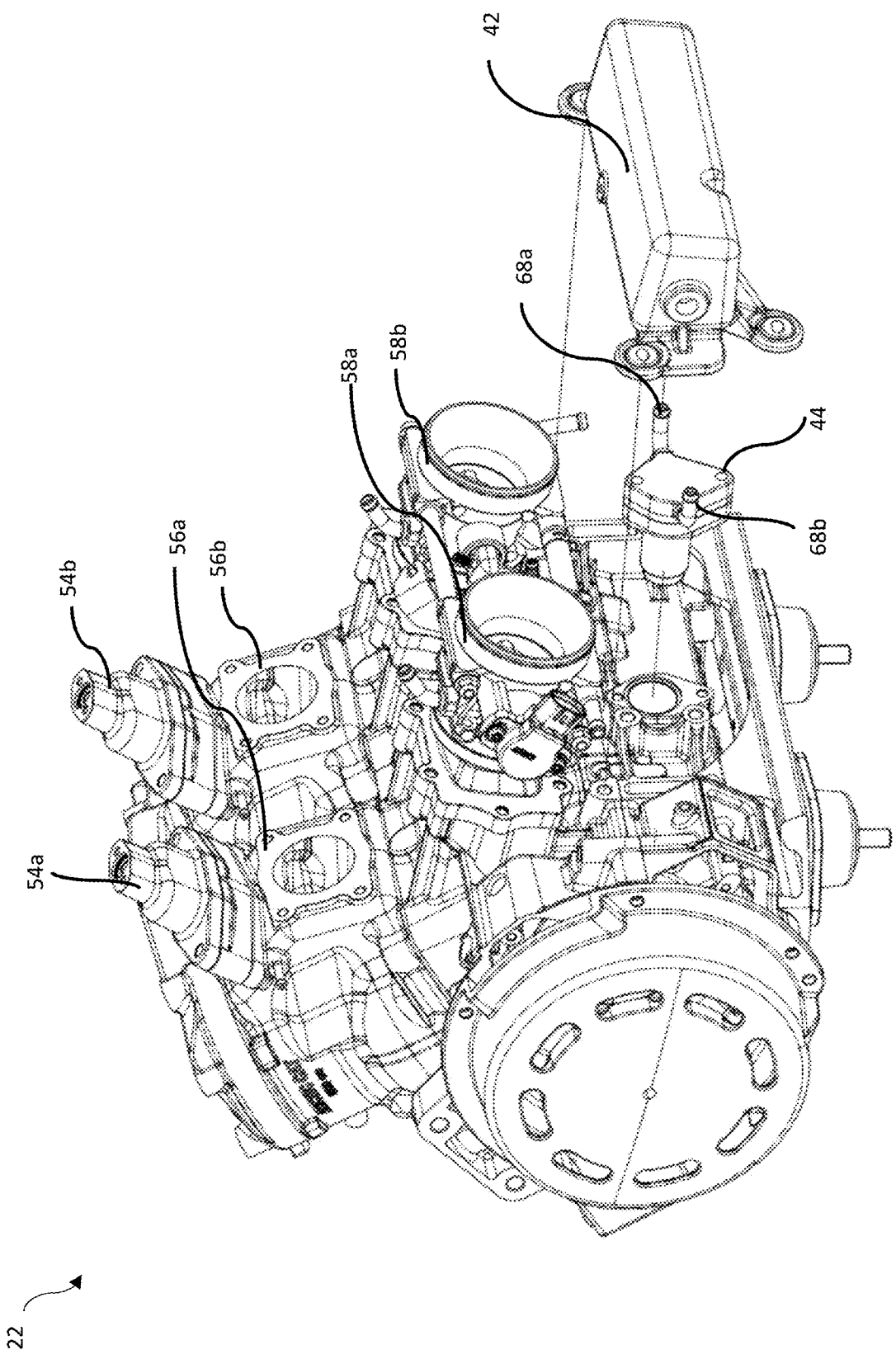
FIG. 5 is a perspective view of a two-stroke engine and exploded view of the oil pump and oil tank according to one embodiment.
Figure 6:
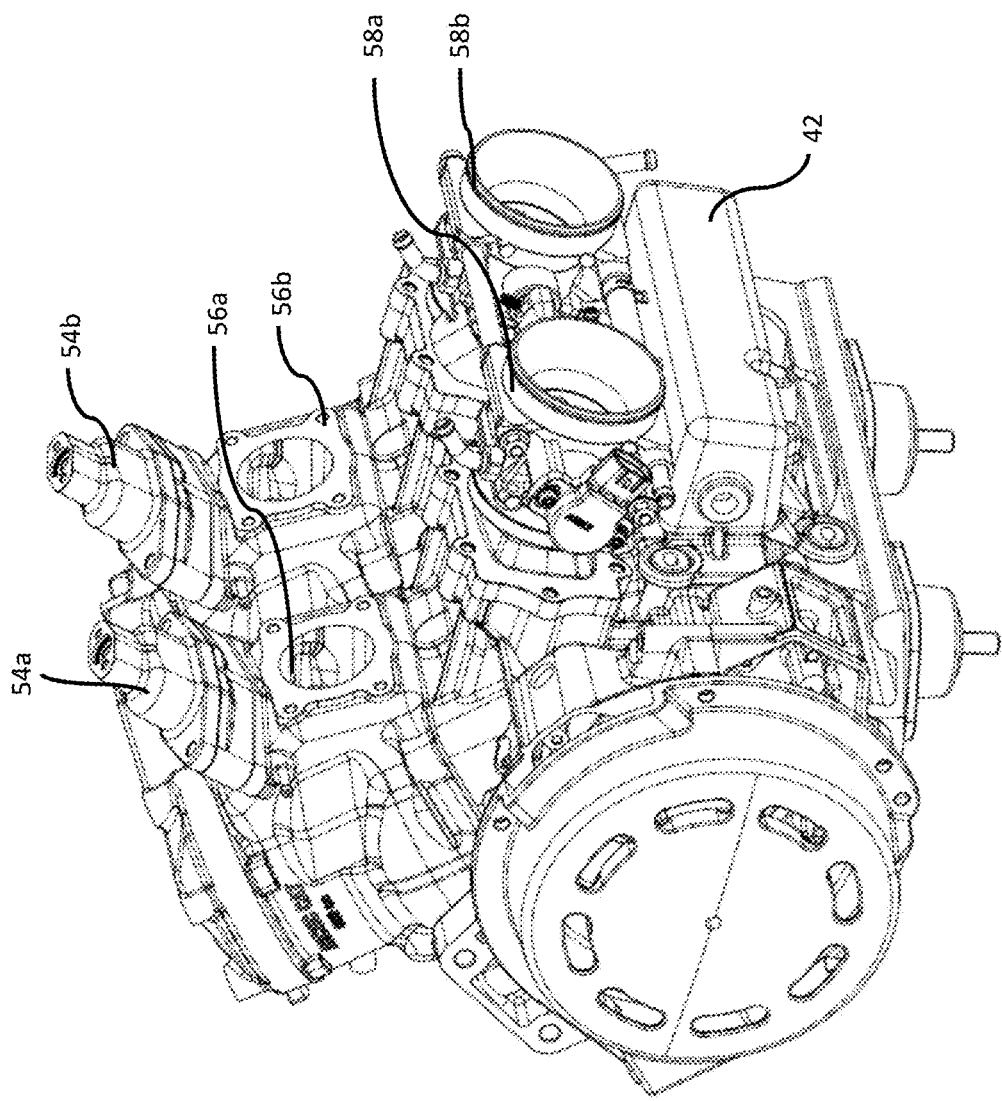
FIG. 6 is a perspective view of a two-stroke engine and installed oil tank according to one embodiment.

Referring now to FIGS. 3-6, perspective views of a two-stroke engine 22 are shown that include the oil pump 44 utilized in the second oiling system described with respect to FIG. 2. In particular, FIG. 3 illustrates oil pump 44 in an assembled and installed state; FIG. 4 illustrates oil pump 44 in an exploded view that illustrates components of an embodiment of an oil pump 44; FIG. 5 illustrates oil pump 44 and an embodiment of an oil tank 42 in an exploded view; and FIG. 6 illustrates an embodiment of an oil pump 44 (not visible) and oil tank 42 in an assembled state.

The embodiments shown in FIGS. 3-6 illustrates a two-cylinder, two-stroke engine, which may or may not include exhaust valve assemblies 54a and 54b (in some embodiments), exhaust ports 56*a* and 56*b*, air intake ports 58*a* and 58*b*, crankshaft 60, oil inlet ports 62, 64*a* and 64*b* associated with the first oiling system 30 (i.e., the total loss oiling system associated with two-stroke engine), and fuel inlet port 66. In some embodiments, fuel is provided to a fuel rail via fuel inlet port 66. First oiling system 30 provides lubrication to engine 22. In particular, oil is mixed directly with fuel via oil inlet port 62, and in addition is distributed into the crankcase via oil inlet ports 64*a* and 64*b*. As discussed above, in at least some embodiments, oil provided by the first oiling system to oil inlet ports 62, 64*a*, and 64*b* is provided at a relatively low pressure, and may therefore not be at a high enough pressure for accessories (not shown in this view) that require a higher oil pressure. In some embodiments, oil provided by the first oiling system to oil inlet ports 62, 64*a*, and 64*b* is provided at pressures less than 10 psi. In the embodiment shown in FIG. 3, the second oiling system 32, which in particular includes oil pump 44 and associated inlet/outlet ports 68*a* and 68*b*, operates a pressure greater than the first oiling system.

In the embodiment shown in FIG. 3, oil pump 44 is mechanically coupled to crankshaft 60. In this way, mechanical power developed in crankshaft 60 is delivered to oil pump 44, which provides pressurized oil to one or more accessories (not shown in this view). As described above, oil inlet ports 62, 64*a* and 64*b* are configured to provide oil to the cylinders and crankcase as part of the two-stroke oiling system (i.e., first oiling system 30), and are therefore not in fluid connection with oil pump 44. That is, as described with respect to FIG. 2, two distinct oiling systems are included: the two-stroke oiling system utilized to lubricate engine components such as the cylinders and crankcase as part of a total loss oiling system, and the pressurized accessory oiling system utilized to provide pressurized oil to one or more accessories. As illustrated in FIG. 3, some benefits of second oiling system 32 are: ability to provide pressurized oil in a limited amount of space (i.e., does not take up much real estate within engine 22); ability to provide oiling systems at different pressures; ability to provide oiling systems with different oils.

FIG. 4 is a perspective view of a two-stroke engine 22 and exploded view of oil pump 44 utilized in the second oiling system 32 according to one embodiment. In the embodiment shown in FIG. 4, oil pump 44 is a gerotor pump that includes mount 70, o-ring 72, bushing 74, shaft extender 76, gerotor housing 78, gear pair 80, inlet/outlet plate 82, inlet/outlet fitting 84, bolts 86*a* and 86*b*, and inlet/outlet port 68*a* and 68*b*.

In this embodiment, oil pump 44 is bolted to mount 70 using one or more fasteners such as bolts 86*a* and 86*b*. A shaft 88 (partially visible) is mechanically coupled to crankshaft 60 to deliver mechanical power from crankshaft 60 to oil pump 44 (e.g., via a power take-off). Rotating shaft 88 is surrounded, at least in part, by bushing 74. In other embodiments, bushing 74 is replaced by a sealed bearing assembly that surrounds rotating shaft 88. Shaft extender 76 is coupled to shaft 88, which in turn is coupled to the gear pair 80 housed within gerotor housing 78. Mechanical power causes one of the gerotor gears to rotate relative to the other gear, which results in fluid (e.g., oil) being pumped from an inlet/outlet port 68*a*, through inlet/outlet plate 82, to the other inlet/outlet port 68*b*. Mechanical power delivered to the gerotor ring (e.g., inner ring) results in oil being pumped from one of the inlet/outlet ports 68*a* to the other inlet/outlet port 68*b*.

FIG. 5 is a perspective view of a two-stroke engine 22 and exploded view of the assembled oil pump 44 and oil tank 42 according to one embodiment. One of the inlet/outlet ports 68*a* and 68*b* is positioned to draw oil from oil tank 42. As a closed-loop system, oil drawn from oil tank 42 by oil pump 44 is provided to one or more accessories and then returned to oil tank 42 as part of a recirculation path.

FIG. 6 shows a perspective view of an embodiment of a two-stroke engine 22 having an oil tank 42 installed. By locating oil pump 44 near the bottom of the engine, in at least some embodiments, oil is returned to oil tank 42 via gravity, without requiring a separate scavenge pump. However, it should be noted that in some embodiments, the location of oil pump 44 and oil tank 42 may be located in an appropriate location or configuration.

Figure 7:
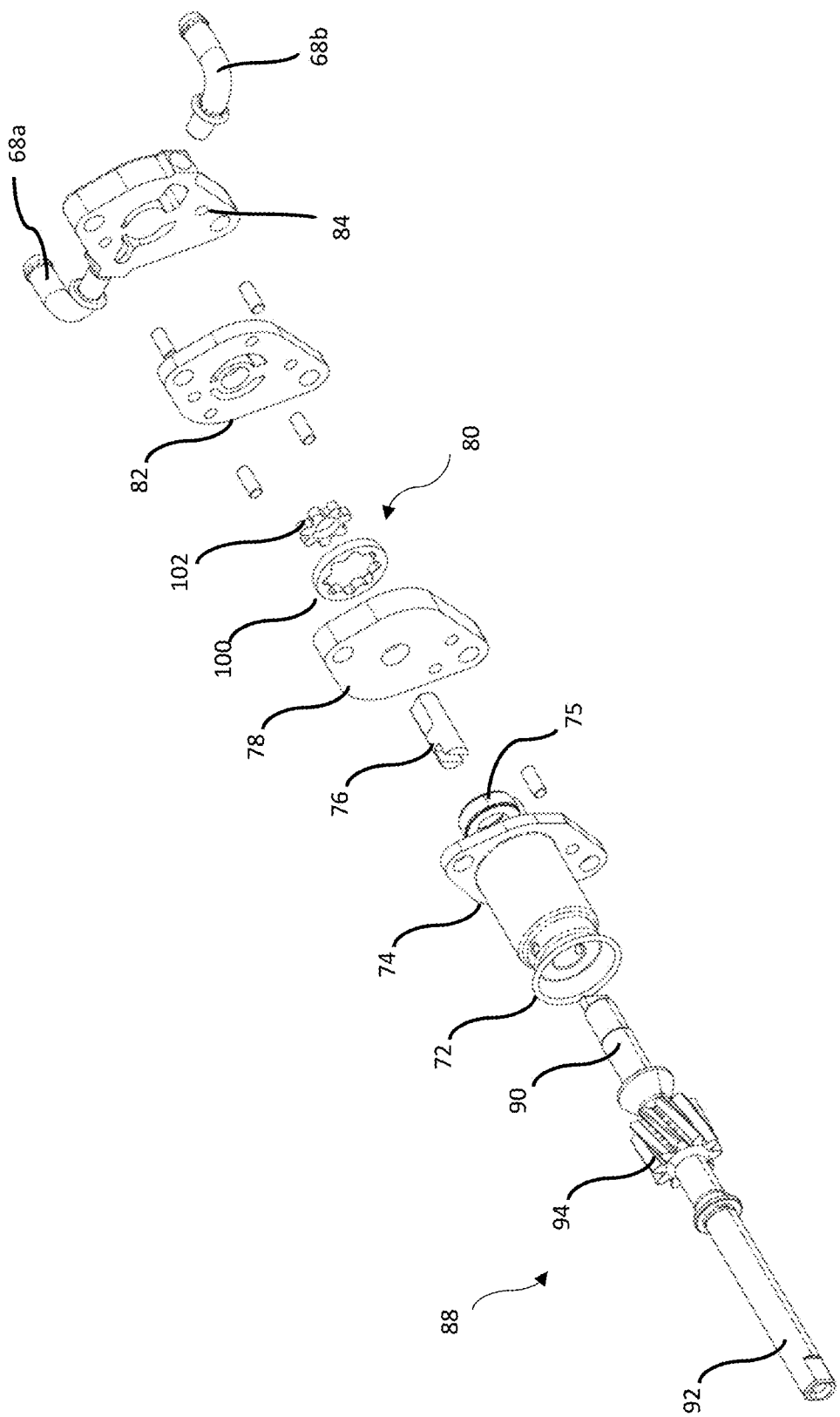
FIG. 7 is an exploded rear view of the oil pump according to one embodiment.
Figure 8:
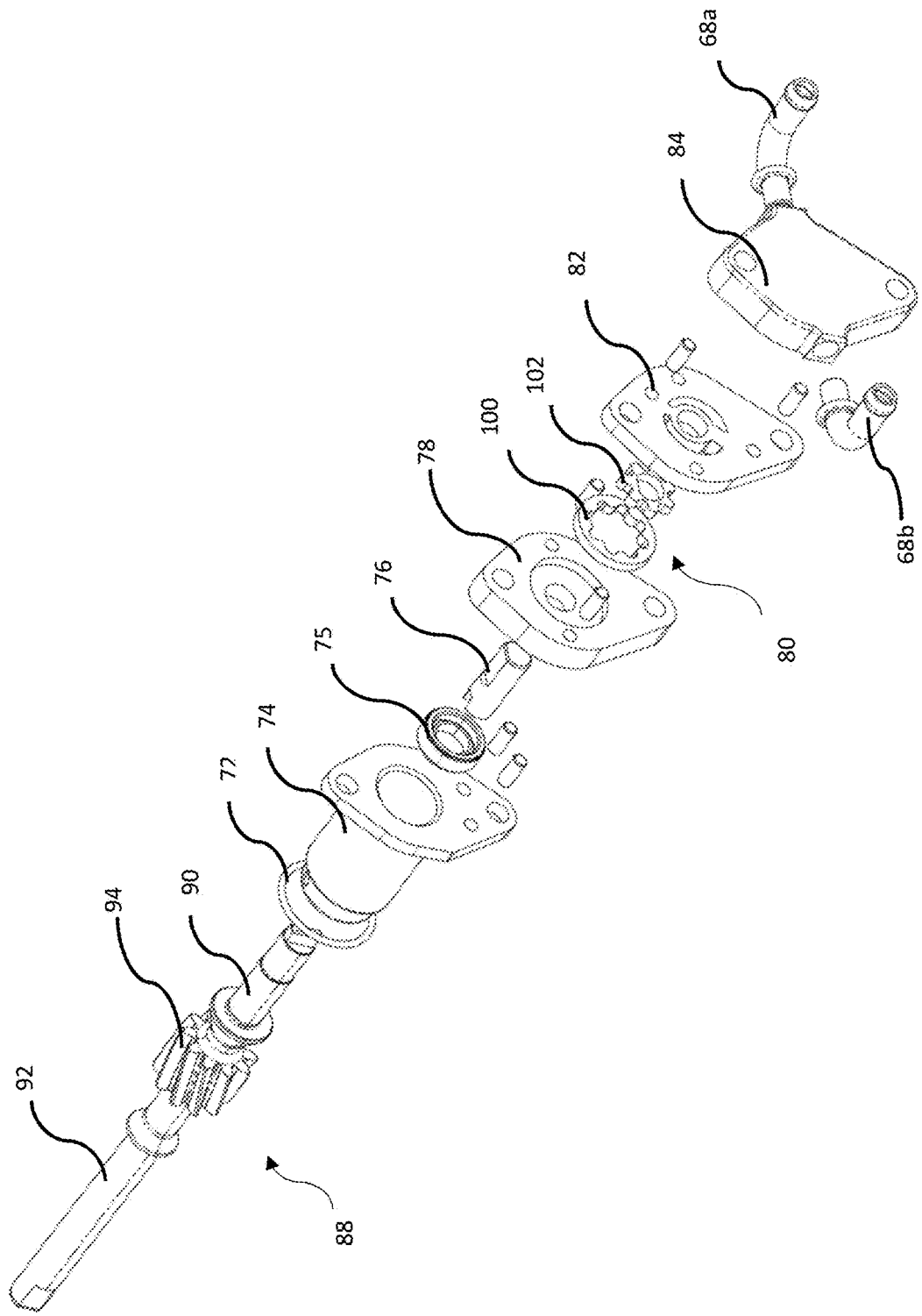
FIG. 8 is an exploded front view of the oil pump according to one embodiment.
Figure 9:
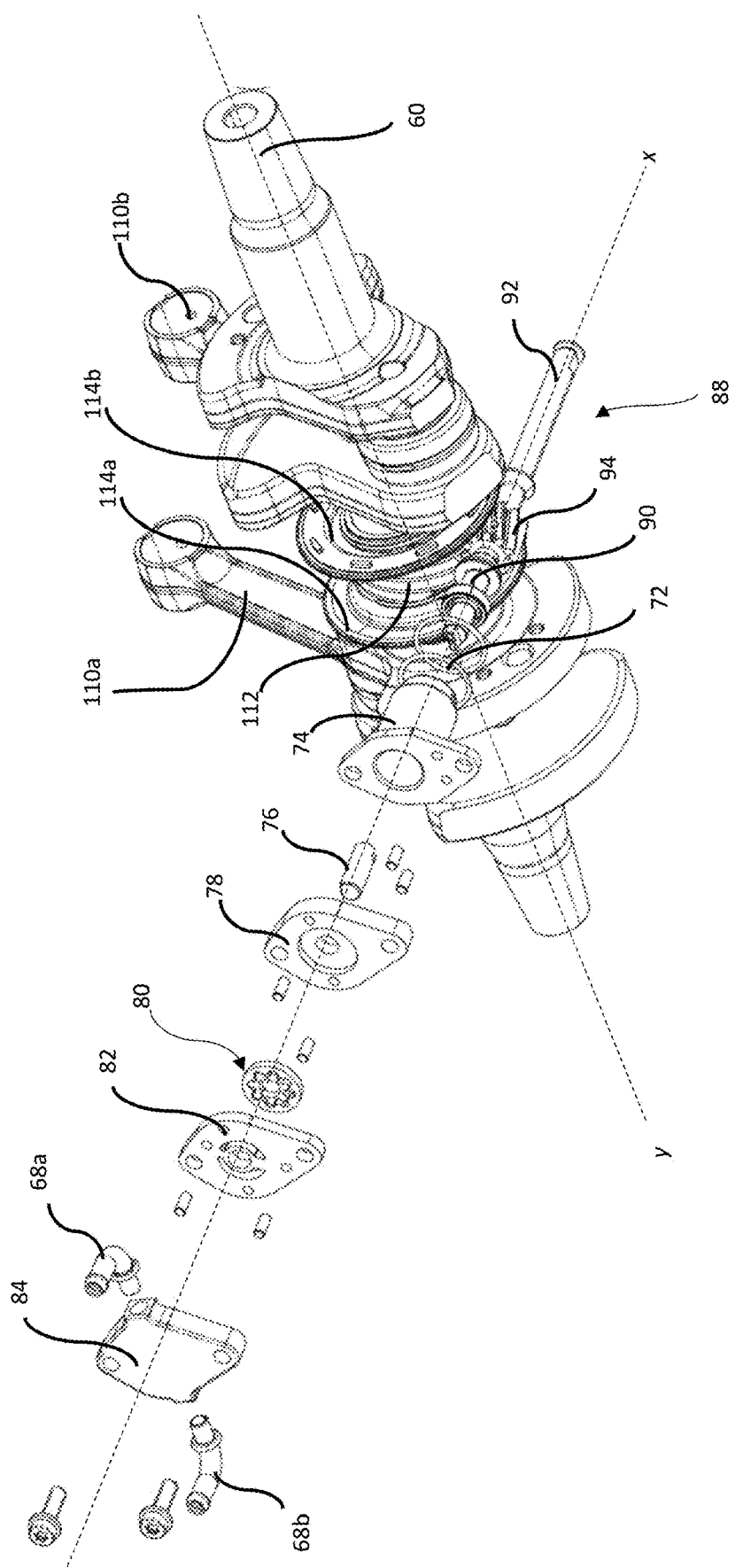
FIG. 9 is an exploded view of the oil pump mechanically coupled to the crankshaft according to one embodiment.

Referring now to FIGS. 7, 8, and 9, exploded views of an embodiment of oil pump 44 are provided. In particular, FIGS. 7 and 8 illustrate exploded views of oil pump 44, and FIG. 9 illustrates an exploded view of oil pump 44, which is mechanically coupled with crankshaft 60 according to various embodiments. As discussed with respect to FIG. 4, oil pump 44 includes o-ring 72, bushing 74, oil seal 75, shaft extender 76, gerotor housing 78, gear pair 80, inlet/outlet plate 82, inlet/outlet fitting 84 and inlet/outlet ports 68*a* and 68*b*. FIGS. 7 and 8 illustrate the power take-off shaft 88 and gearing utilized to transfer mechanical power from crankshaft 60 to oil pump 44. The embodiment shown in FIGS. 7 and 8, power take-off shaft 88 includes first portion 90, second portion 92 and gear 94. In some embodiments, gear 94 is a helical gear or spur gear that is coupled to the gear 112 (shown in FIG. 9) of crankshaft 60 in a crossed configuration in order to communicate mechanical power from a first axis to a perpendicular axis. In one embodiment, first oiling system 30 provides oil to lubricate the gear 112 (e.g., worm gear), wherein provided oil is returned to oil first oil tank 34 (shown in FIG. 2) and eventually provided to inlet ports 62, 64*a* and 64*b*, as part of the total loss oiling system.

The first portion 90 of power-take-off shaft 88 is housed and, in some embodiments, at least partially supported via bushing 74. As discussed above, in some embodiments the bushing 74 may be replaced with a sealed bearing assembly (e.g., roller bearing or ball bearing). First portion 90 is coupled to shaft extender 76, which in turn is mechanically coupled or integral in some embodiments to inner gear 102 of the gear pair 80. In this way, mechanical energy developed by the engine 22 in crankshaft 60 is communicated to inner gear 102. As inner gear 102 rotates relative to outer gear 100, the difference in number of teeth between inner gear 102 and outer gear 100 results in oil being drawn into the gears from a suction port (e.g., either inlet/outlet port 68*a* or 68*b*) and expelled through a discharge port (e.g., inlet/outlet port 68*a* or 68*b*). In some embodiments, the rotational speed of the shaft determines, at least in part, the volume, flow rate, and/or pressure of the oil expelled through the discharge port. As the shaft speed increases, the volume, flow rate, and/or pressure of oil discharged increases. In other embodiments, the pressure, flow rate, and/or volume of oil discharged is further calibrated by alternate widths of inner gear 102 and outer gear 100. In some embodiments, a pressure regulator is utilized in conjunction with the oil pump 44 to limit/regulate the oil pressure provided. In some embodiments, the pressure regulator may be incorporated as part of oil pump 44, while in other embodiments the pressure regulator may be implemented external to oil pump 44, for example downstream of the oil pump 44. In some embodiments, the oil pump 44 is a variable flow pump, for example a gerotor variable flow pump.

FIG. 9 illustrates the interaction between gear 94 and crankshaft 60. In particular, FIG. 9 illustrates connecting rods 110a and 110b, which are connected at a distal end to respective pistons (not shown), for example via wrist pins (also not shown), and on the other end to crankshaft 60. Although shown in FIG. 9 in relation to a two-cylinder engine, engines of any number of cylinders can be employed. The reciprocating motion provided by the pistons and connecting rods 110a and 110b causes crankshaft 60 to rotate about an axis y. In the embodiment shown in FIG. 9, crankshaft 60 includes gear 112, located between connecting rods 110a and 110b (and further located between oil seals 114a and 114b). Gear 112 is configured to interact with gear 94, causing power take-off shaft 88 to rotate about axis x. In some embodiments, axis x is perpendicular to axis y. The gears 112 and 94 are selected to provide the desired gear ratio, which may vary depending on the application.

Figure 10:
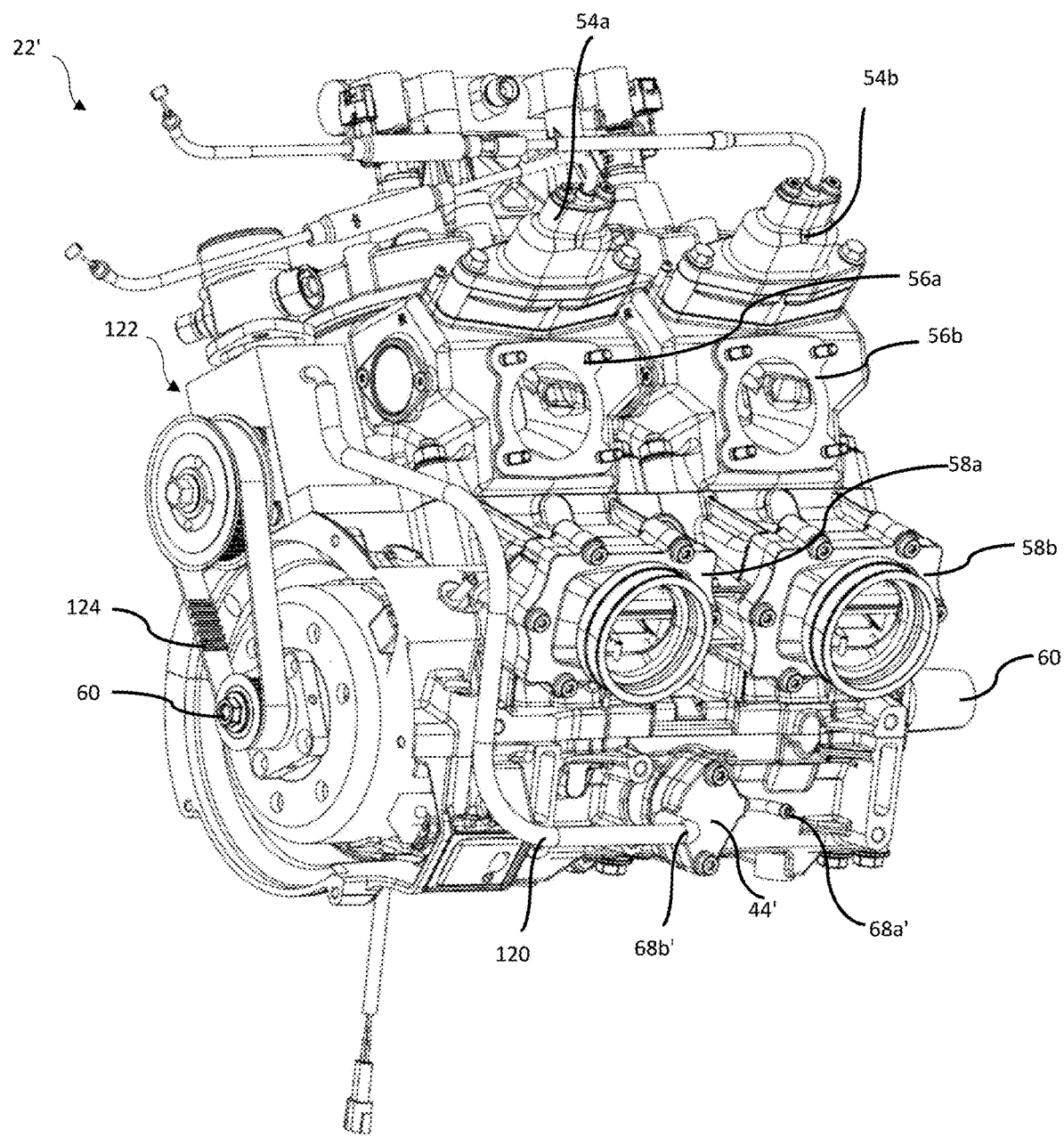
FIG. 10 is a perspective view of a two-stroke engine including an accessory connected to receive oil from the closed-loop oiling system according to one embodiment.

Referring now to FIG. 10, a perspective view of a two-stroke engine 22' is provided that illustrates an accessory connected to receive oil from the closed-loop oiling system. Components of two-stroke engine 22' remain relatively the same as that described with respect to FIGS. 3-6. However, in this embodiment, two-stroke engine 22' further includes an accessory 122. In the embodiment shown in FIG. 10, accessory 122 is a high-pressure direct injection (HPDI) pressure pump assembly that is coupled to crankshaft 60 via belt 124. Although shown as being driven by a belt 124, in some embodiments, the accessory 122 can be driven by a chain, gear set, or in any other suitable way. In this embodiment, one or more cam lobes (not visible) included as part of the HPDI pressure pump assembly 122 are utilized to convert rotational motion to linear motion/actuation of accessories associated with engine 22'. Lubrication of the cam lobes is provided by oil pump 44', which provides pressurized oil via line 120 to HPDI pressure pump assembly 122. Line 120 may be a flexible hose or a hard tube, depending on the application. In other embodiments, accessory 122 may be utilized in applications other than HPDI pressure pump assembly.

Oil provided to accessory 122 is returned to oil tank 42 (shown in FIG. 5). In some embodiments, because accessory 122 is located above oil pump 44' and oil tank 42, pressurized oil provided to accessory 122 is returned to oil tank 42 by way of gravity. In other embodiments, however, a sump and scavenge pump may be relied upon to return oil to oil tank 42 as part of the closed-loop pressurized oiling system. In addition, in some embodiments a pressure regulator may be connected between oil pump 44' and accessory 122—e.g., along line 120—to regulate the pressure of oil provided to accessory 122. In some embodiments, line 120 is flexible while in some embodiments it is formed from a stiff material. In some embodiments, the pressure regulator may be connected to oil tank 42 (as shown in FIG. 5), in which excess oil is directed to oil tank 42 to maintain a desired oil pressure, for example via a bypass. In some embodiments, the pressure regulator is incorporated as part of oil pump 44'.

In some embodiments, accessory 122 requires oil pressure greater than that provided by the total loss oiling system (i.e., first oiling system 30) connected to provide oil to engine 22. In particular, in some embodiments, oil pressure greater than 10 PSI is provided to accessory 122. In some embodiments, an oil pressure greater than 20 PSI is provided to accessory 122, and in some embodiments an oil pressure greater than 40 PSI is provided to accessory 122.

Figure 11A:
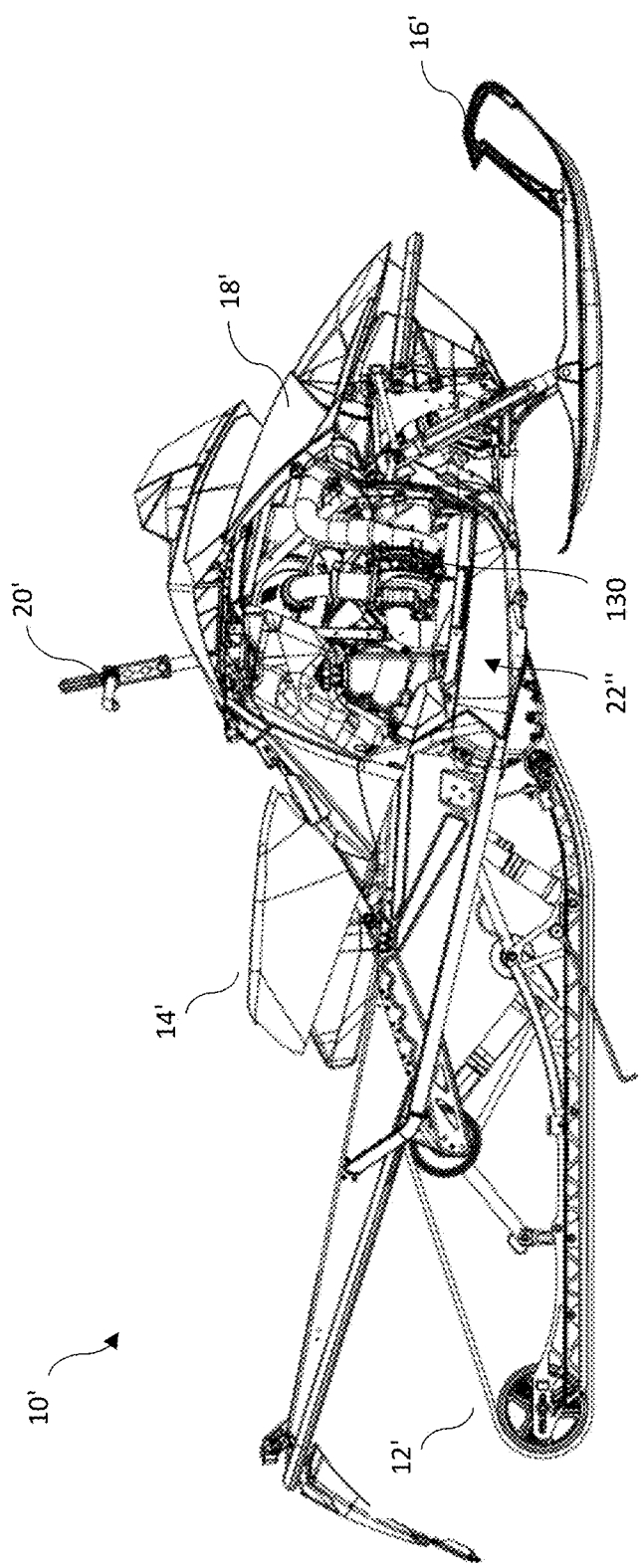
FIGS. 11A-11B are side views of a snow vehicle including a turbocharger according to one embodiment.
Figure 11B:
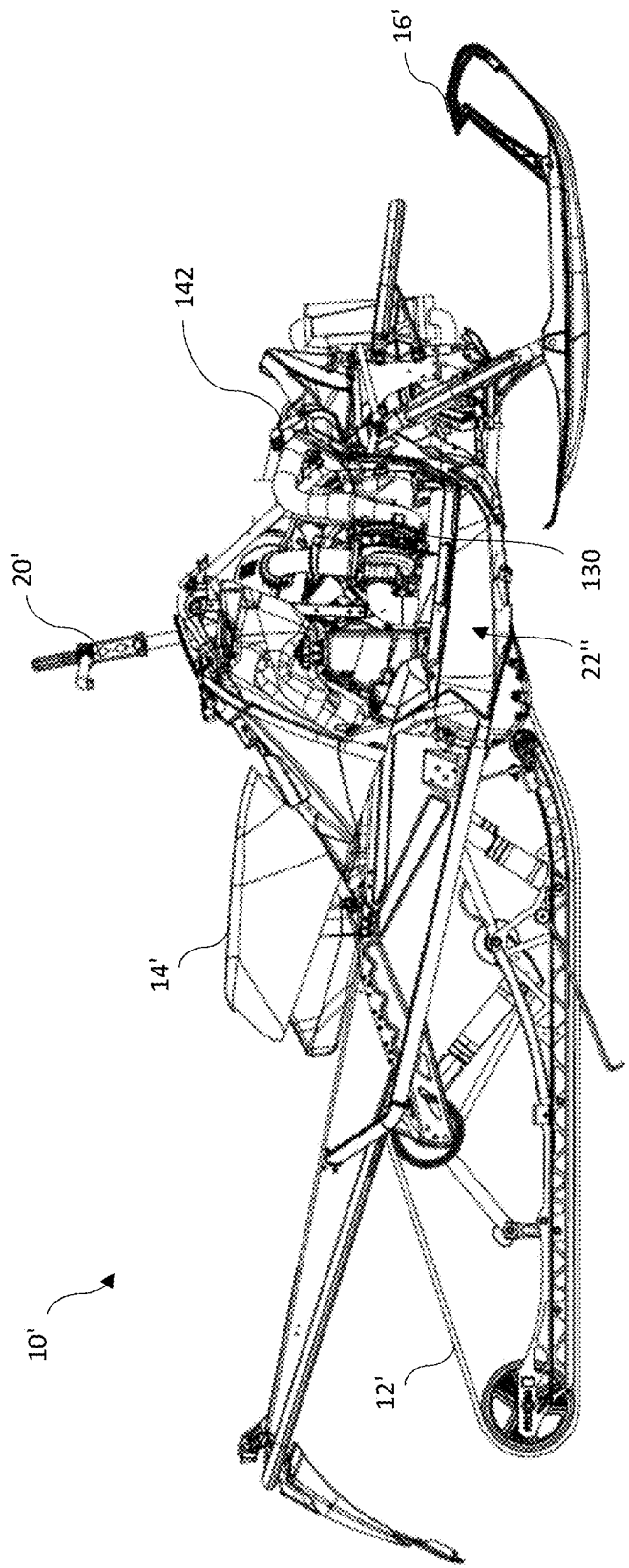

Referring now to FIGS. 11A-11B, an embodiment of a snowmobile 10' is illustrated that employs a turbocharger 130 configured to provide compressed air to the cylinders, wherein a second oiling system (i.e., closed-looped oiling system) is utilized to provide pressurized oil to the turbocharger 130. In particular, FIGS. 11A and 11B are side views of snowmobile 10' that illustrates a possible position of turbocharger 130 relative to engine 22". In the embodiment shown in FIGS. 11A and 11B, snowmobile 10' includes track 12', seat 14', one or more skis 16', hood 18', handlebars 20' and engine 22" (partially obscured by hood 18). As discussed in more detail below, engine 22" includes a first oiling system and a second oiling system. The first oiling system is a total loss oiling system utilized to lubricate engine 22". The second oiling system is a pressurized, closed-loop oiling system utilized to provide lubrication to one or more accessories associated with engine 22", including at least turbocharger 130. The second oiling system includes at least one pump (not visible in this view), mechanically coupled to the engine 22" to provide the desired oil pressure—for example greater than that provided in the first oiling system. Utilizing a second oiling system, distinct from the first oiling system, allows engine 22" to make use of accessories—such as turbocharger 130—that requires a higher oil pressures than that made available in a typical two-stroke engine relying on a total loss oiling system.

As discussed in more detail below, turbocharger 130 is connected to receive exhaust from engine 22", wherein mechanical energy is extracted from the flow of the exhaust and utilized to drive a compressor that provides compressed air for mixture with the fuel provided to the cylinders. In the embodiment shown in FIGS. 11A-11B, the compressed air is cooled by intercooler 142 prior to mixing with fuel. In one embodiment, intercooler 142 may be an air-to-air intercooler or a water-to-air intercooler.

In the embodiment shown in FIGS. 11A and 11B, turbocharger 130 is positioned adjacent to engine 22", with intercooler 142 positioned in front of engine 22". In other embodiments, the location of intercooler 142 relative to engine 22" may be modified. For example, in some embodiments, intercooler 142 may be positioned behind engine 22" or above engine 22". Air compressed by turbocharger 130 is provided to intercooler 142, to cool the compressed air prior to provision to air intake ports (not shown in this view). The second oiling system is connected to provide lubrication to turbocharger 130. As a closed-loop oiling system, oil provided to turbocharger 130 is returned to the oil tank (e.g., oil tank 42 shown in FIG. 11C or oil tank 42" shown in FIG. 12).

Figure 12:
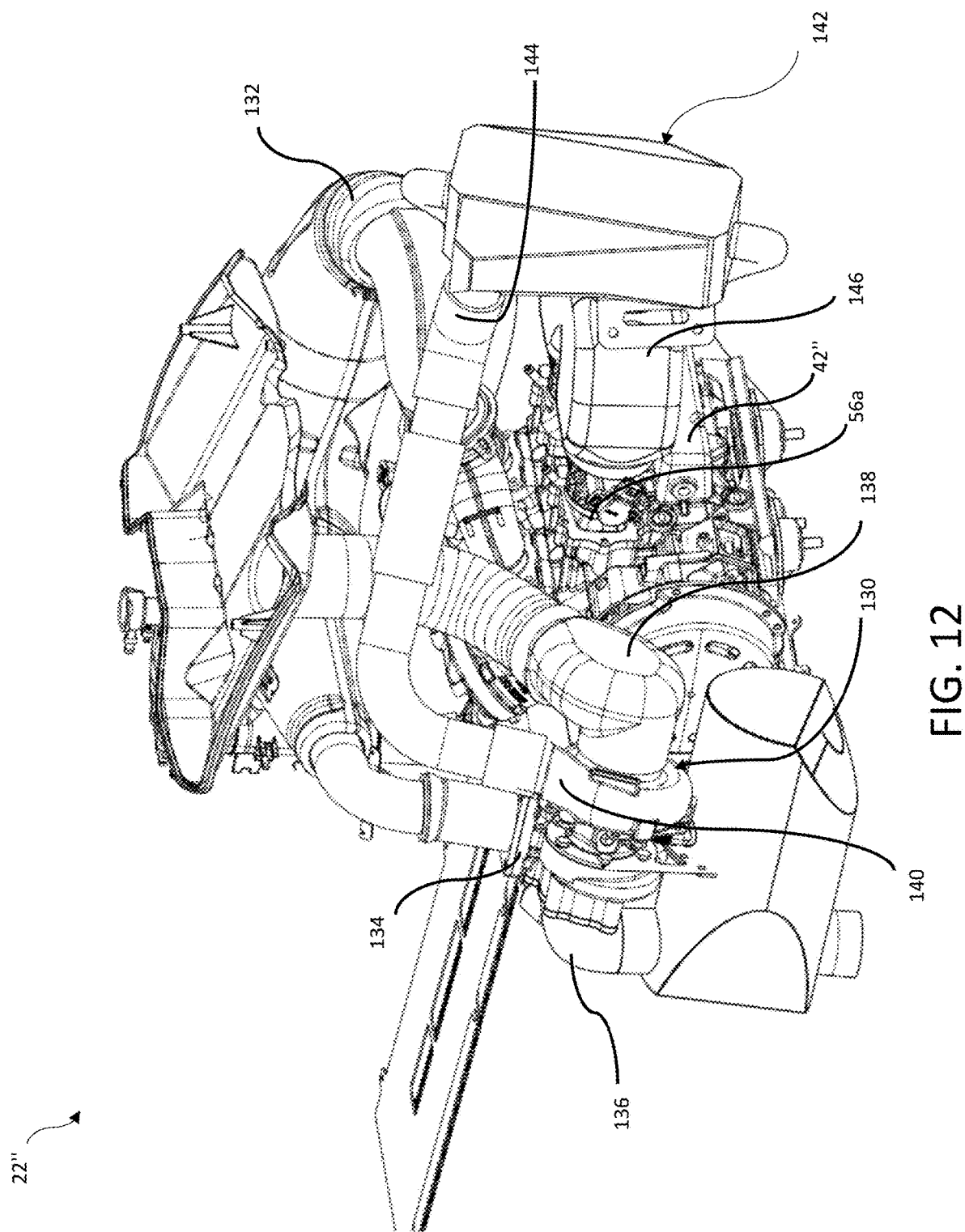
FIG. 12 is a perspective view of a two-stroke engine including a turbocharger connected to receive oil from the closed-loop oiling system according to one embodiment.

FIG. 12 is a perspective view illustrating the relative positions of turbocharger 130, intercooler 142, oil tank 42" and an oil pump (obscured by oil tank 42") according to some embodiments. Turbocharger 130 is connected to receive oil from the closed-loop oiling system (i.e., second oiling system 32 shown in FIG. 2), which includes an oil pump (e.g., similar to oil pump 44 shown in FIG. 3 and/or oil pump 44' shown in FIG. 10) and oil tank 42" (wherein the oil pump is obscured by oil tank 42"). In some embodiments, the turbocharger 130 is utilized in conjunction with another accessory such as the one described with respect to FIG. 10. In some embodiments, the turbocharger 130 is used without the additional accessory described with respect to FIG. 10. In some embodiments, however, the turbocharger 130 can be used in conjunction with one or more additional accessories, such as the HPDI system previously described. In some embodiments, turbocharger 130 includes exhaust inlet port 134, exhaust outlet port 136, air inlet port 138, and compressed air outlet port 140. In general, a turbocharger operates by receiving exhaust provided by engine 22" (see exhaust path 132). The exhaust is provided to exhaust inlet port 134. A turbine located within the turbocharger 130 is utilized to extract energy (e.g., mechanical power) from the received exhaust. The mechanical energy extracted by the turbine (not shown) is utilized to provide power to a compressor (not shown), which compresses air received at air inlet port 138 to provide compressed air at compressed air outlet port 140. The compressed air is provided to the air intake ports (of which, air intake port 58a is visible) of two-stroke engine 22".

In some embodiments, such as that shown in FIG. 12, compressed air is provided to an intercooler 142 to cool the compressed air prior to being provided to air intake port. In the embodiment shown in FIG. 12, intercooler is connected to receive compressed air from turbocharger 130 via air intake port 144. Intercooler cools the received compressed air, and outputs the cooled, compressed air to air intake ports via output port 146. Air output port 146 may be integrally formed with intercooler 142, or may be attached to intercooler 142. In some embodiments, such as that shown in FIG. 12, intercooler 142 is an air-to water intercooler utilizing a liquid coolant to remove heat from the compressed air. In some embodiments, the turbocharger is utilized without an intercooler 142.

Figure 15:
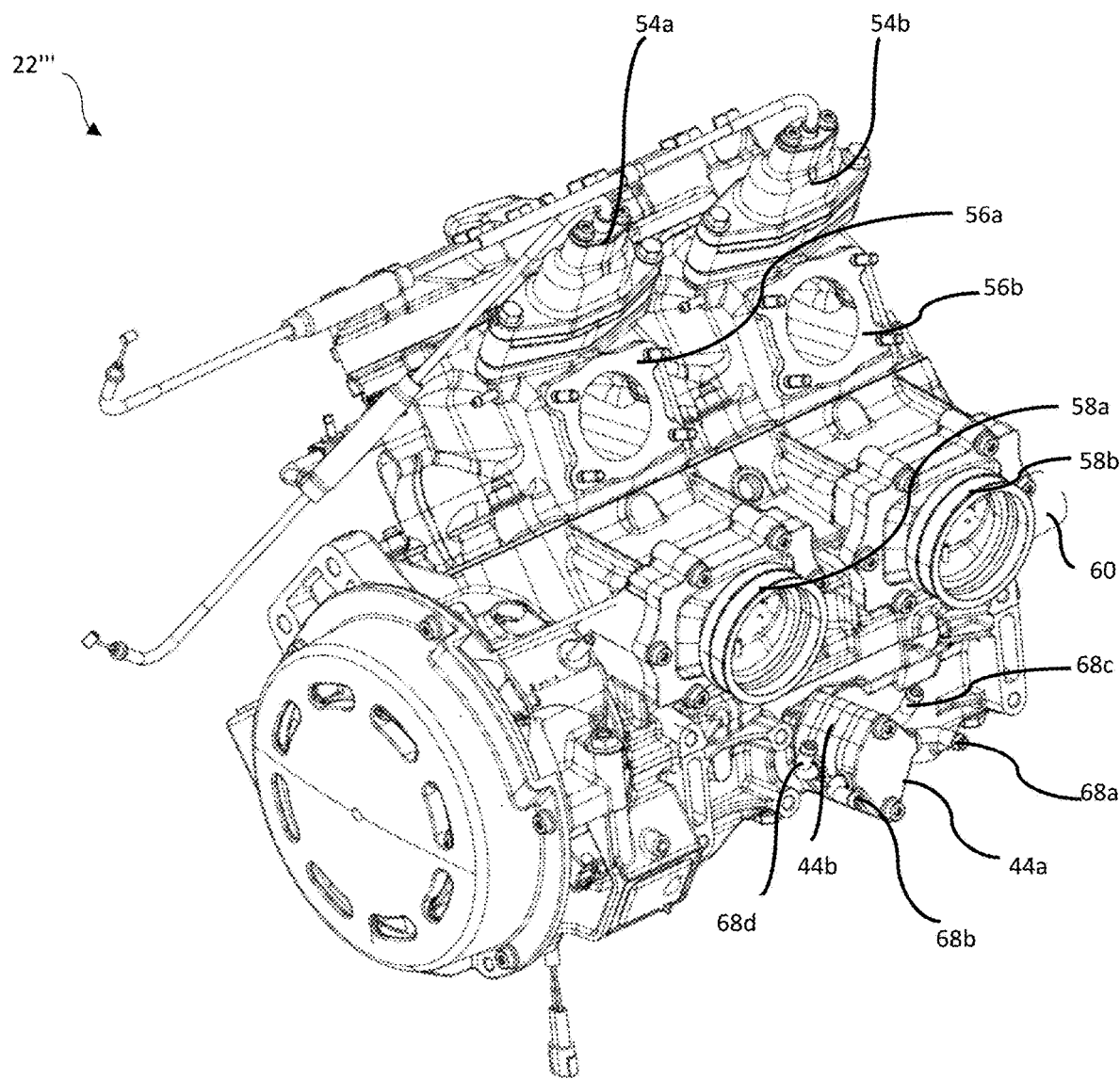
FIG. 15 is a perspective view of a two-stroke engine including a pair of oil pumps configured in a stacked configuration according to one embodiment.

Oil provided to turbocharger 130 is returned to oil tank 42". In some embodiments, because turbocharger 130 is located above and oil tank 42", pressurized oil provided to turbocharger 130 is returned to oil tank 42" by way of gravity. In particular, in some embodiments, the oil outlet port of turbocharger 130 (shown in FIG. 13B as oil outlet port 150) is positioned above (i.e., at a higher elevation) oil tank 42", and in addition oil tank 42" is positioned above the inlet to the oil pump, such that gravity is utilized to move oil from the oil outlet of turbocharger 130, to oil tank 42", and to the inlet of the oil pump. However, in some embodiments, due to the inclination of the snowmobile on various terrain or other anomalies that may prevent oil from draining back into oil tank 42", a scavenge pump (and in some embodiments a sump) may be relied upon to return oil to oil tank 42" as part of the closed-loop pressurized oiling system (as shown in FIG. 15). In addition, in some embodiments, a pressure regulator may be connected between the oil pump and turbocharger 130 to regulate the pressure of oil provided to turbocharger 130. The regulator may return excess oil to oil tank 42" (or any other desirable part of the system) in order to maintain a desired oil pressure. In other embodiments, the pressure regulator is incorporated as part of the oil pump.

In some embodiments, turbocharger 130 requires an oil pressure greater than that provided to the engine as part of the total loss oiling system. In some embodiments, oil pressure provided to the turbocharger 130 is greater than 10 PSI. In some embodiments, oil pressure provided to turbocharger 130 is greater than 20 PSI. In some embodiments, oil pressure provided to turbocharger 130 is greater than 40 PSI.

Figure 13A:
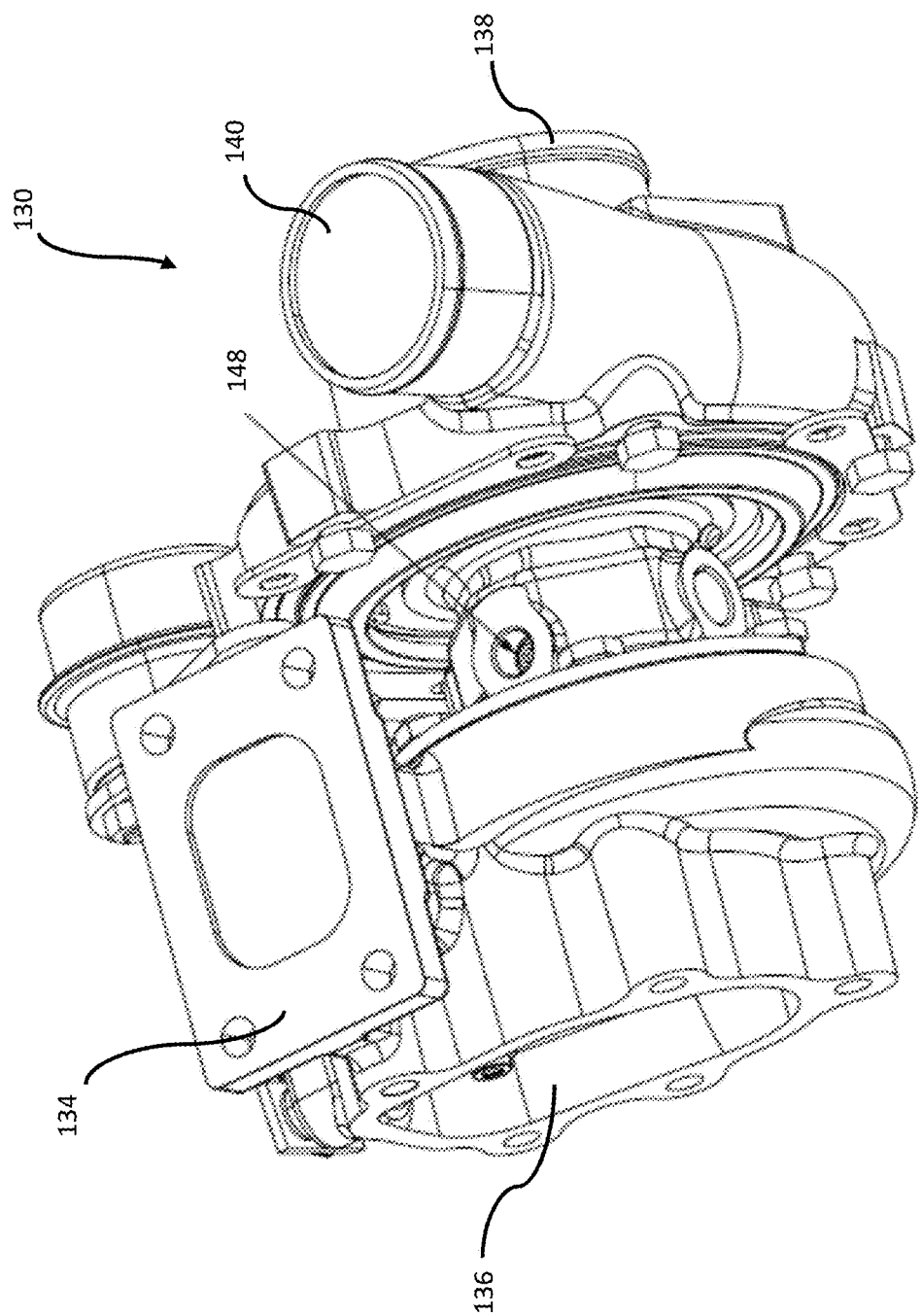
FIGS. 13A and 13B are perspective views of a turbocharger according to one embodiment.
Figure 13B:
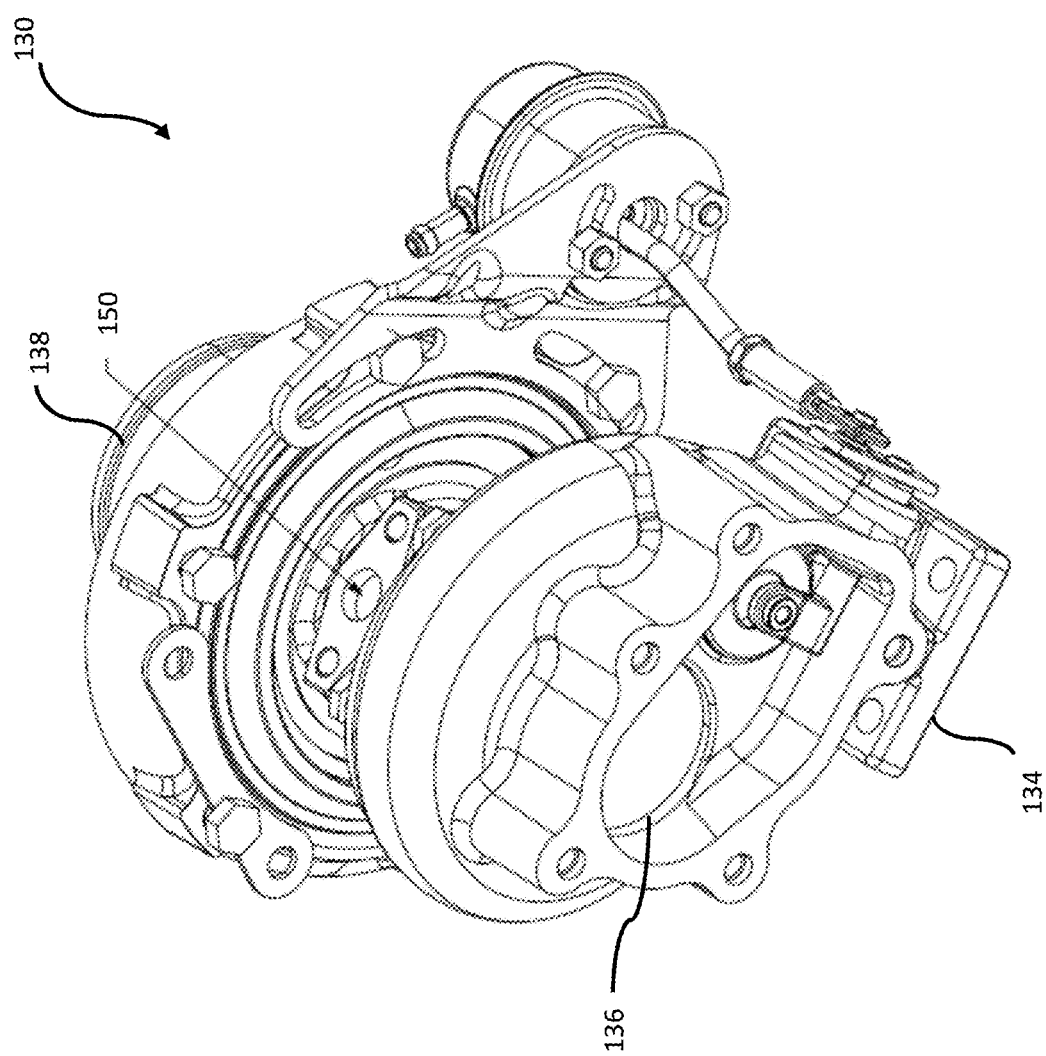

Referring now to FIGS. 13A and 13B, perspective views of a turbocharger 130 are shown according to some embodiments. Turbocharger 130 once again includes exhaust inlet port 134, exhaust outlet port 136, air inlet port 138, and compressed air outlet port 140. FIG. 13A illustrates the location of oil inlet port 148 connected to receive pressurized oil from the oil pump (e.g., oil pump 44 as shown in FIG. 3 or oil pump 44' shown in FIG>10). In this embodiment, oil inlet port 148 is located on a top side of turbocharger 130. Oil provided at oil inlet port 148 may be provided at a pressure regulated by the oil pump and/or pressure regulator located internal to the oil pump or connected between the oil pump and oil inlet port 148. Oil provided at oil inlet port 148 is utilized to lubricate components of turbocharger 130, such as bearings. After being used to lubricate turbocharger, the oil exits turbocharger 130 via oil outlet port 150 and is returned to oil tank 42" (as shown in FIG. 12). FIG. 13B illustrates the location of oil outlet port 150 connected to return oil to oil tank 42". In some embodiments, oil outlet port 150 is located on the bottom of turbocharger 130. In some embodiments, oil tank 42" is located below oil outlet port 150, such that oil exiting turbocharger 130 via oil outlet port 150 is returned to oil tank 42" as a result of gravity. In some embodiments, a scavenge pump (and in some embodiments a sump) is utilized to aid the return of oil to oil tank 42" as part of the closed loop pressurized oiling system.

Figure 14A:
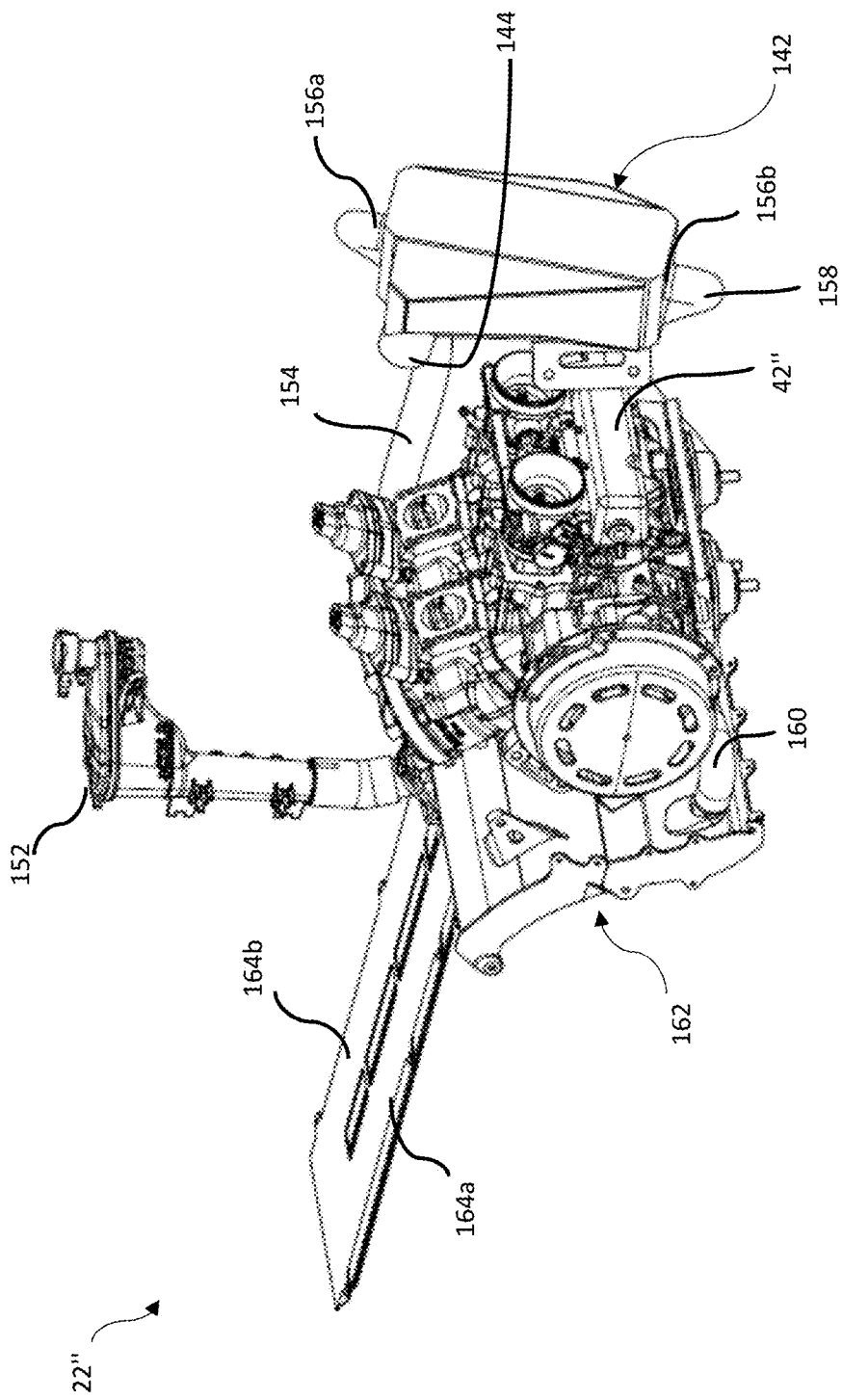
FIGS. 14A-14D are perspective views of a cooling circuit utilized in conjunction with a turbocharger and intercooler according to one embodiment.
Figure 14B:
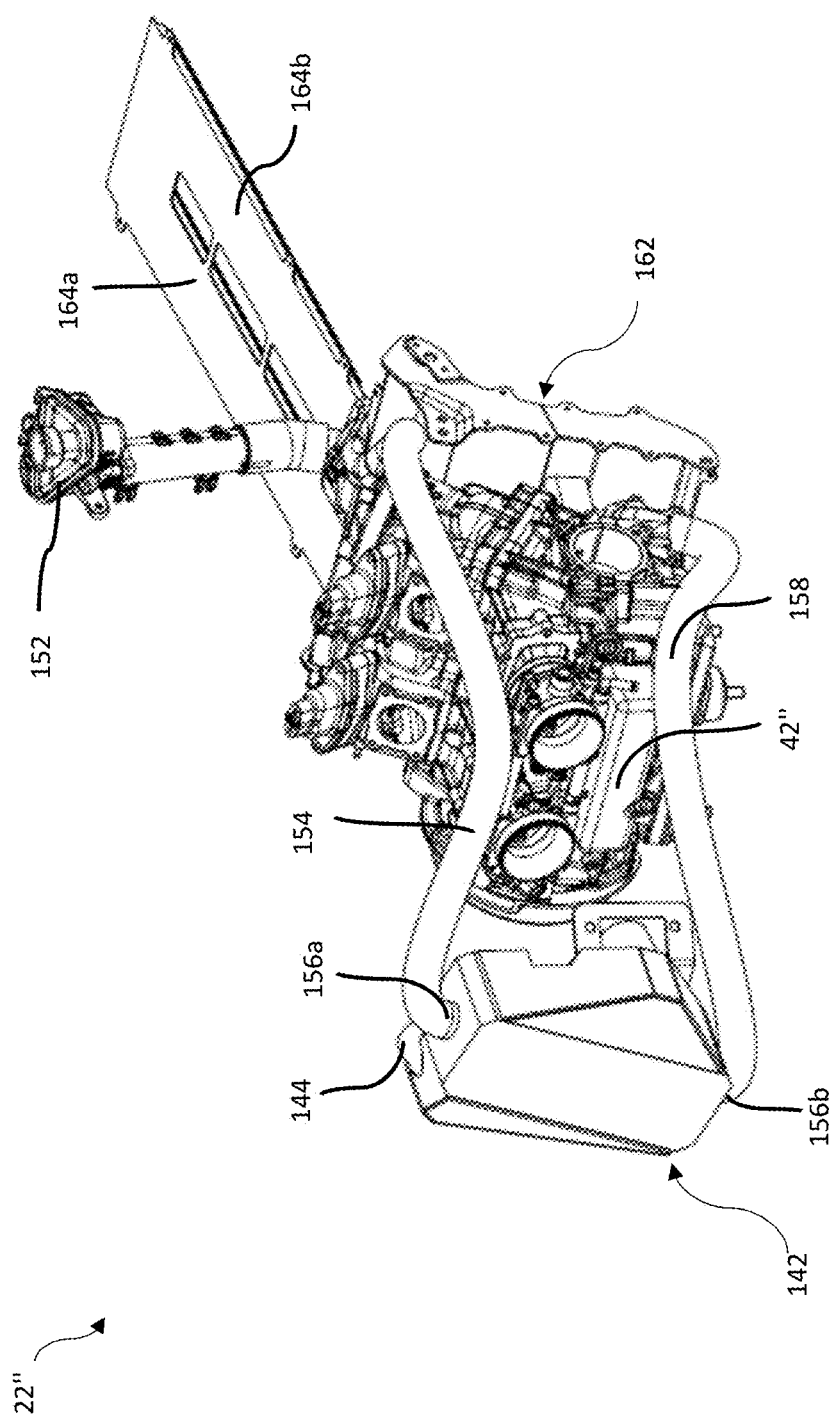
Figure 14C:
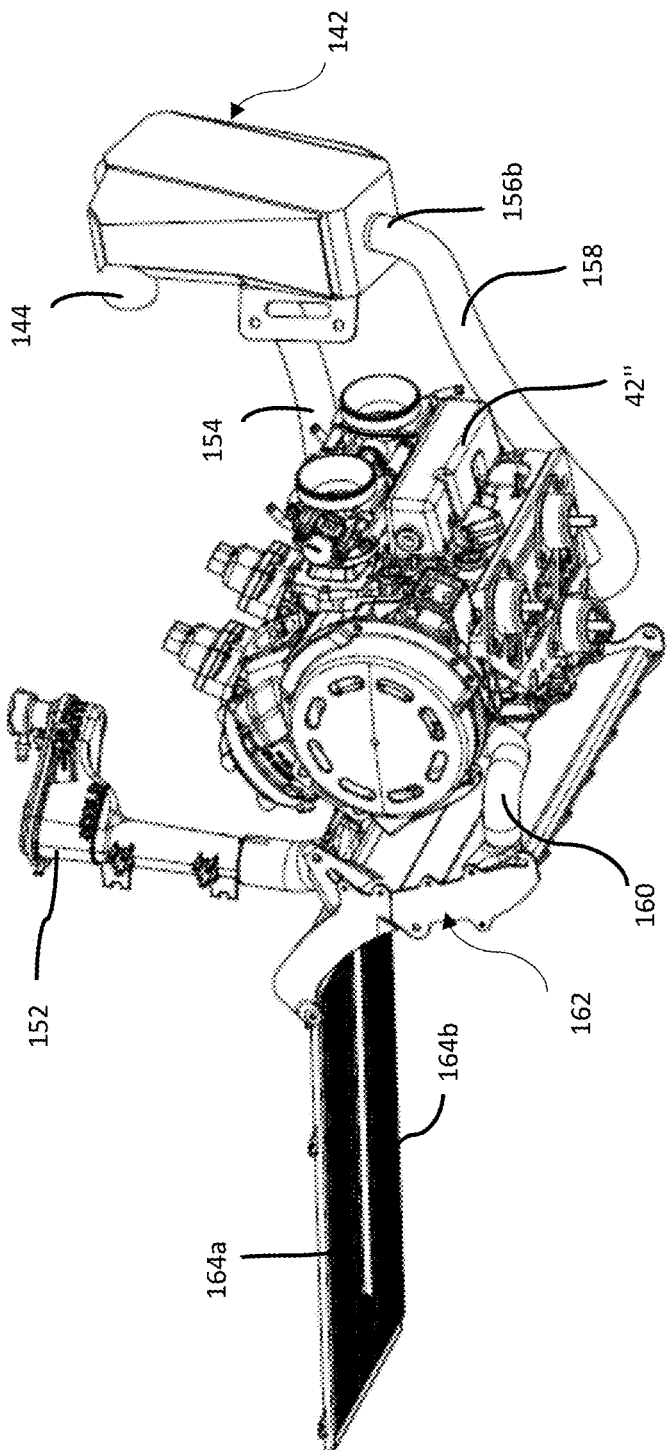
Figure 14D:
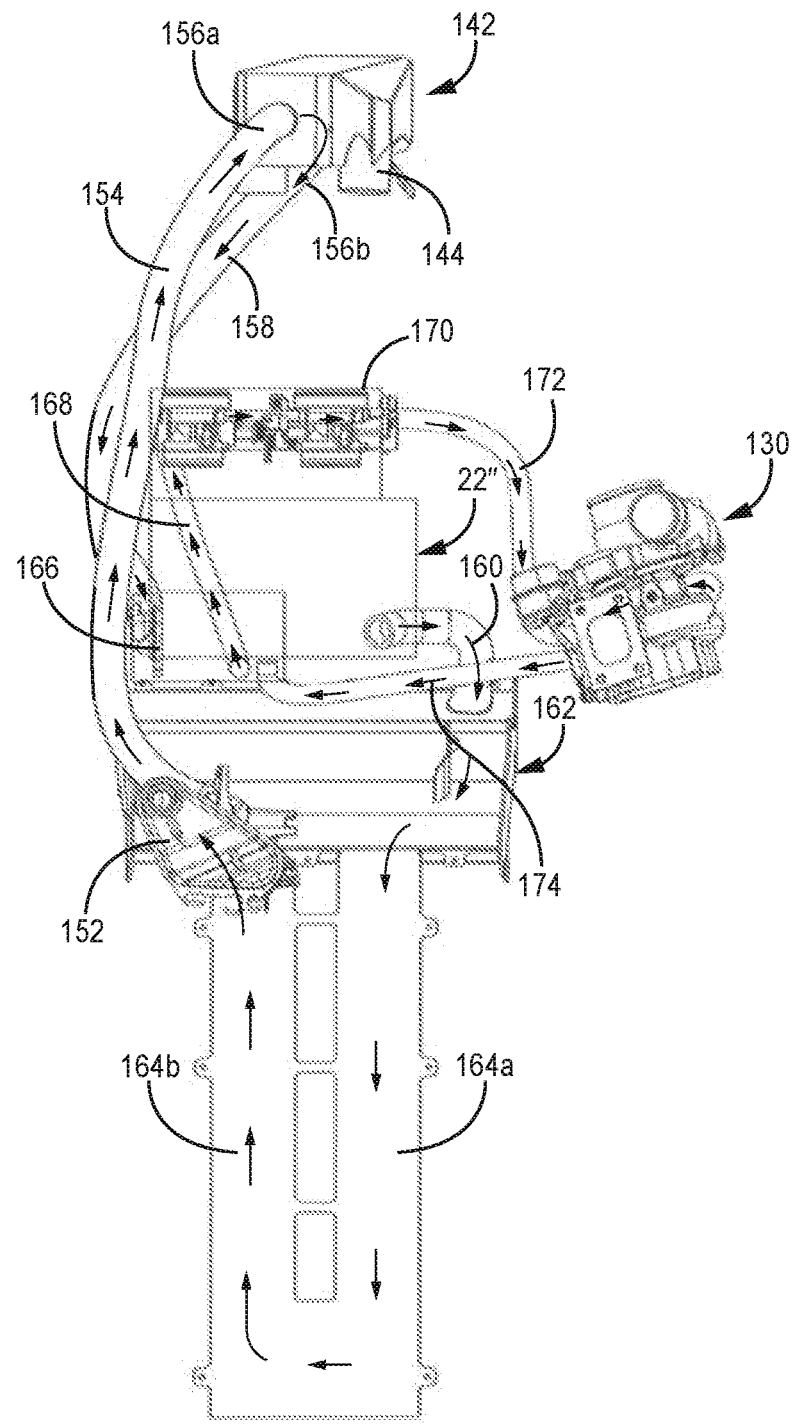

Referring now to FIGS. 14A-14D, a coolant system is illustrated according to some embodiments. FIGS. 14A-14C are perspective views illustrating the connections of the coolant system and location relative to engine 22", and FIG. 14D is a top view that illustrates the flow of coolant through the coolant system according to some embodiments. In the embodiment shown in FIGS. 14A-14C, turbocharger 130 has been removed from the view to better illustrate coolant system. An embodiment illustrating the connection of the turbocharger 130 to the coolant system is illustrated in FIG. 14D.

In the embodiment shown in FIGS. 14A-14C, the coolant system includes coolant tank 152, which in some embodiments includes a cap, hose/tube 154, 158, and 160, heat exchanger 162. In at least some embodiments, the heat exchanger 162 includes cooling channel(s) 164a, 164b. In some embodiments, coolant is utilized to extract heat from the compressed air provided to intercooler 142. Coolant is stored in coolant tank 152, in conjunction with the rest of the system, and provided to intercooler 142 via hose/tube 154. Intercooler 142 includes a coolant inlet port 156a for receiving coolant, which is then directed through intercooler 142 to extract heat from the compressed air provided by turbocharger 130 (not shown in this view). Coolant exits intercooler 142 via coolant output port 156b, and is provided to a water pump (not shown in this view, but shown in FIG. 14D as water pump 166). The water pump pumps the coolant received from intercooler 142 through engine 22", and then through various components to remove/extract heat from the coolant before the process is repeated. In addition, coolant may in some embodiments be provided to other accessories such as turbocharger 130 and/or other accessories to provide heat removal. In some embodiments, coolant output port 156b of intercooler 142 is elevated relative to water pump 166 to allow coolant pumped through intercooler 142 to be provided via gravity to water pump 166. In some embodiments, coolants is provided by heat exchangers 162 (e.g., through or cooling channels 164a, 164b)—at which point the coolant is at a lowest temperature within the cooling circuit—is provided first to intercooler 142, and then to engine 22". A benefit of this approach is that, in some embodiments, it maximizes the cooling effect of intercooler 142 (e.g., maximum cooling of the compressed air provided by turbocharger 130 to intercooler 142). In other embodiments, coolant may be pumped separately to intercooler 142 and engine 22", in parallel fashion rather than being provided first to one component and then to another.

Referring to FIG. 14D, a coolant flow path according to one or more embodiments is illustrated. As illustrated in FIG. 14D, the coolant flow path is a closed-loop system in which coolant is circulated to transfer thermal energy as required. Coolant is added to the system via the cap associated with coolant tank 152. In some embodiments, the coolant flow path comprises one or more coolant loops. In some embodiments, water pump 166 provides coolant to the one or more coolant loops. However, in other embodiments, additional water pumps may be utilized to separately provide coolant to each coolant loop. In some embodiments the first coolant loop includes the intercooler 142 and engine 22", and a second coolant loop that includes throttle bodies 170 and turbocharger 130. The first coolant loop provides coolant from heat exchanger 162 via hose/tube 154 to intercooler 142. The relative temperature of coolant provided from heat exchanger 162 to intercooler 142 is lower than elsewhere in the cooling circuit. The coolant (relatively low temperature) flows through intercooler 142 from coolant inlet port 156*a* to coolant output port 156*b*. The coolant flows from intercooler 142 to water pump 166 via hose/tube 158. The coolant provided from intercooler 142 extracts thermal energy from the intercooler to cool the compressed air provided to the engine 22". Thus, the temperature of the coolant leaving intercooler 142 via hose/tube 158 may be higher than the temperature of the coolant provided to intercooler 142. Subsequently, the coolant is provided to water pump 166 (which may also contain a cavity, reservoir, etc. for coolant), which pumps the coolant through the cooling circuit(s). In some embodiments, the coolant is directed to the engine 22" and then the coolant returns to the heat exchanger 162 via hose/tube 160. In general, coolant exiting the engine 22" via hose/tube 160 is at a temperature higher than that provided to intercooler 142.

In some embodiments, another or second coolant loop includes throttle body 170 and engine accessory—such as turbocharger 130. Water pump 166 pumps coolant to throttle body 170 via tube/hose 168, and then via tube hose 172 to turbocharger 130. However, in some embodiments the coolant may be pumped through turbocharger 130 and then through throttle body 170. In some embodiments, coolant is used to heat the throttle body (or throttle bodies) 170 in order to prevent freezing/icing in snow vehicle applications. Coolant provided to turbocharger 130 is returned to water pump/reservoir 166 via tube hose 174. In some embodiments, the two or more coolant flow paths are not separate paths, but instead result in the coolant from the two or more coolants paths mixing in the engine 22", water pump 166, and heat exchanger(s) 162.

To dissipate heat from the coolant, the coolant is provided to heat exchanger 162 and cooling channels 164*a* and 164*b*. These components are designed to extract heat from the coolant flowing through them, such that the coolant can be returned at a sufficiently low temperature to provide cooling. In the embodiment shown in FIG. 14D, coolant (now relatively cool) exits the heat exchanger 162 and is provided via hose/tube 154 to intercooler 142.

The embodiment of the cooling circuit shown in FIG. 14D provides coolant to intercooler 142, and coolant exiting intercooler 142 is provided to water pump 166. In this way, coolant provided to intercooler 142 is likely to be a temperature that is low relative to the temperature of the coolant in other parts of the cooling circuit. This assures that the temperature of the coolant provided to the intercooler is low relative to other parts of the cooling circuit, to provide maximum cooling of the compressed air provided by the turbocharger 130 to the intercooler 142. In other embodiments, the order in which coolant is pumped to intercooler 142, turbocharger 130, throttle body 170, and/or engine 22" may be varied. In still other embodiments, the air-to-water intercooler shown in FIG. 14D is implemented as an air-to-air intercooler, in which intercooler 142 would not be included as part of the coolant circuit.

In some embodiments, the intercooler 142 is located forwardly of the engine 22"; in some embodiments, however, the intercooler 142 can be located above, below, behind, or to a side of the engine 22". In some embodiments, multiple intercoolers are utilized, for example one on each side of the engine 22".

Referring now to FIG. 15, a perspective view of a two-stroke engine 22''' is shown that illustrates a stacked configuration of first and second oil pumps 44*a* and 44*b*. First oil pump 44*a* includes inlet/outlet ports 68*a* and 68*b*, and second oil pump 44*b* includes inlet/outlet ports 68*c* and 68*d*. In the embodiment shown in FIG. 15, the size of oil pumps 44*a* and 44*b* are approximately the same, as are the size of inlet/outlet ports 68*a*-68*d*. However, in other embodiments the first and second oil pumps 44*a* and 44*b* may be sized differently, according to the respective roles of each. Similarly, the size of inlet/outlet ports 68*a*-68*d* may be sized differently based on the application.

As illustrated in FIG. 15, oil pumps 44*a* and 44*b* are located adjacent to one another, in a stacked configuration along the axis of the shaft driving oil pumps 44*a* and 44*b* (e.g., perpendicular to the axis defined through the crankshaft 60). Both pumps 44*a* and 44*b* are therefore driven by the same shaft mechanically coupled to crankshaft 60 (not visible in this view). In some embodiments, first oil pump 44*a* is a pressurized oil pump that provides pressurized oil to one or more accessories, and second oil pump 44*b* is a scavenge pump that aids in returning oil from the one or more accessories to oil tank 42 (not shown in this view). In some embodiments, first oil pump 44*a* is a scavenge oil pump that aids in returning oil from the one or more accessories to oil tank 42 (not shown in this view), and second oil pump 44*b* is a pressurized oil pump that provides pressurized oil to one or more accessories.

Referring now to FIGS. 16A-16F, block diagrams of a pressurized oiling system (or closed loop-oiling system, such as that described in FIG. 2) according to various embodiments. It should be noted that a vehicle will, in at least some embodiments, also include a first oiling distribution system, such as a total-loss oiling system, that is utilized to lubricate the engine. The pressurized oiling system is separate from the first or total loss oiling system.

Figure 16A:
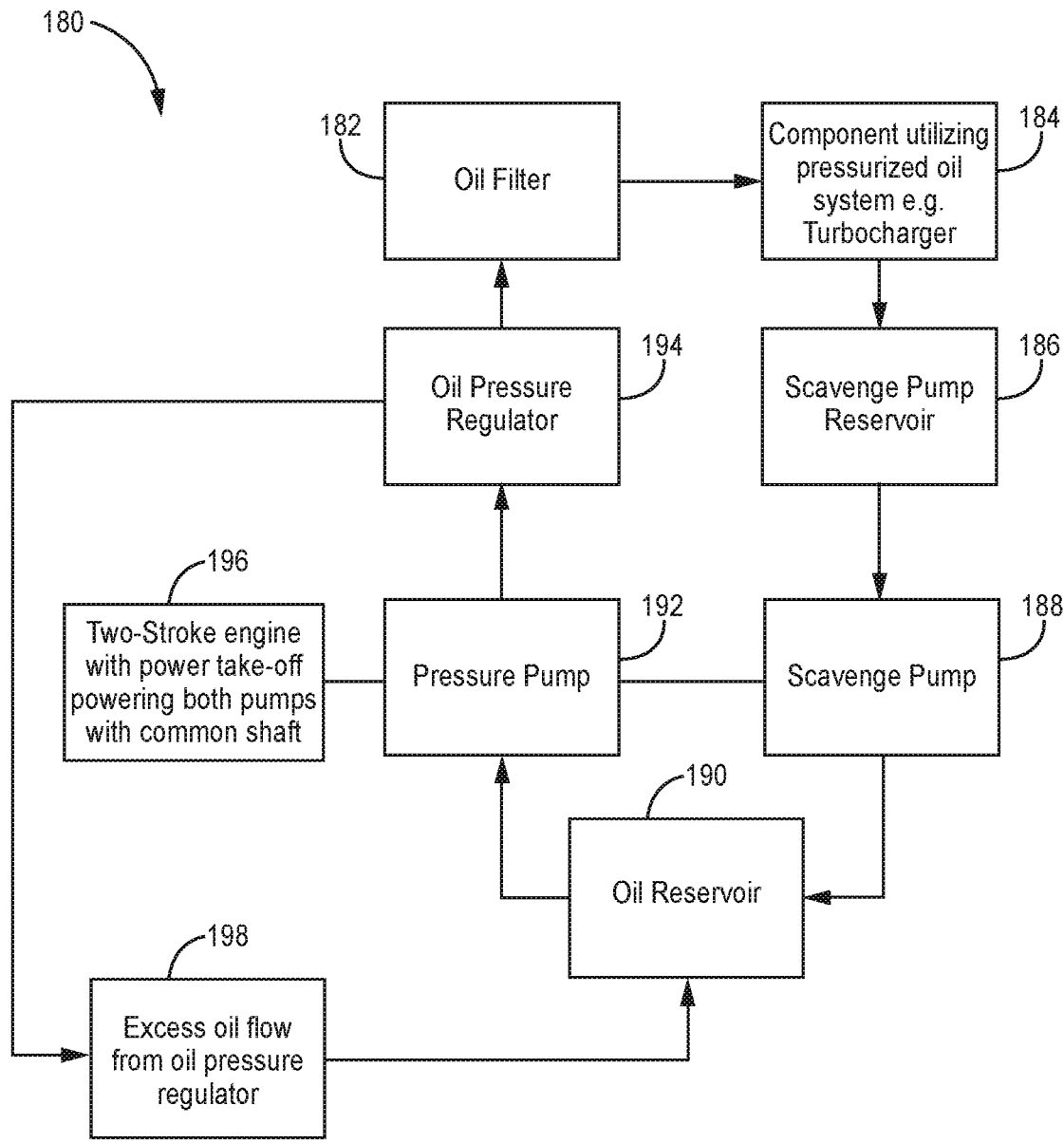
FIG. 16A-16F are block diagrams of a closed-loop oiling system according to various embodiments.

In particular, FIG. 16A illustrates a pressurized oiling system 180 that includes oil filter 182, accessory 184, scavenge pump reservoir 186, scavenge pump 188, oil reservoir 190, pressure pump 192, oil pressure regulator 194, and two-stroke engine 196. As shown in FIG. 16A, in some embodiments, pressure pump 192 and scavenge pump 188 are mechanically coupled to two-stroke engine 196, for example via a common shaft driving both pumps. Mechanical power developed by two-stroke engine 196 is provided to pressure pump 192 and scavenge pump 188. For example, pressure pump 192 and scavenge pump 188 may be located adjacent one another in a stacked configuration, such as that shown in FIG. 15. Pressure pump 192 is fluidly connected to pump oil from oil reservoir 190 to oil pressure regulator 194. Oil pressure regulator 194 maintains the oil provided by pressure pump 192 at a desired pressure. In the embodiment shown in FIG. 16A, if the pressure exceeds a desired pressure, excess oil is directed back to oil reservoir 190 via excess oil path 198. Oil filter 182 filters pressurized oil provided by oil pressure regulator 194 and provides filtered oil to accessory 184. For example, as discussed above, accessories requiring pressurized oil may include turbochargers, HPDI pressure pump assembly, etc. As provided above, accessories may include any devices requiring pressurized oil for lubrication. Pressurized oil provided to accessory 184 for lubrication is returned to scavenge pump reservoir 186. Scavenge pump 188 pumps oil collected in scavenge pump reservoir 186 to oil reservoir 190. In some embodiments, the pressurized oiling system(s) described herein can also include an oil cooler in any suitable location in the circuit.

Figure 16B:
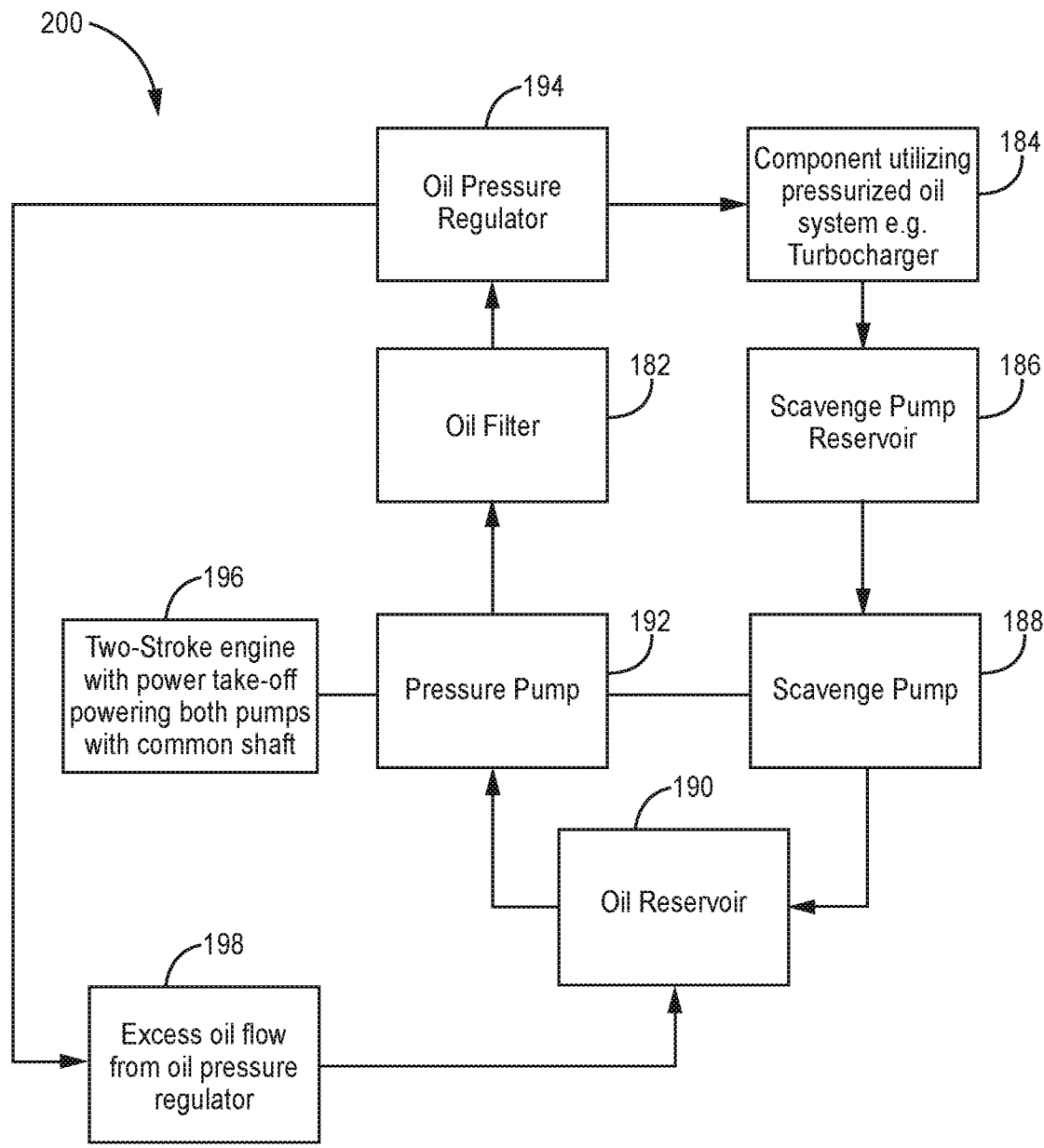

FIG. 16B illustrates a pressurized oiling system 200 that includes the same components described with respect to FIG. 16A. In the embodiment illustrated in FIG. 16B, the position of oil filter 182 and oil pressure regulator 194 in the oil flow diagram are switched. As a result, pressurized oil pumped by pressure pump 192 is provided to oil filter 182 and then to oil pressure regulator 194. In the event pressurized oil provided to oil pressure regulator 194 exceeds the desired pressure, overflow oil is directed back to oil reservoir 190 via excess oil path 198.

Figure 16C:
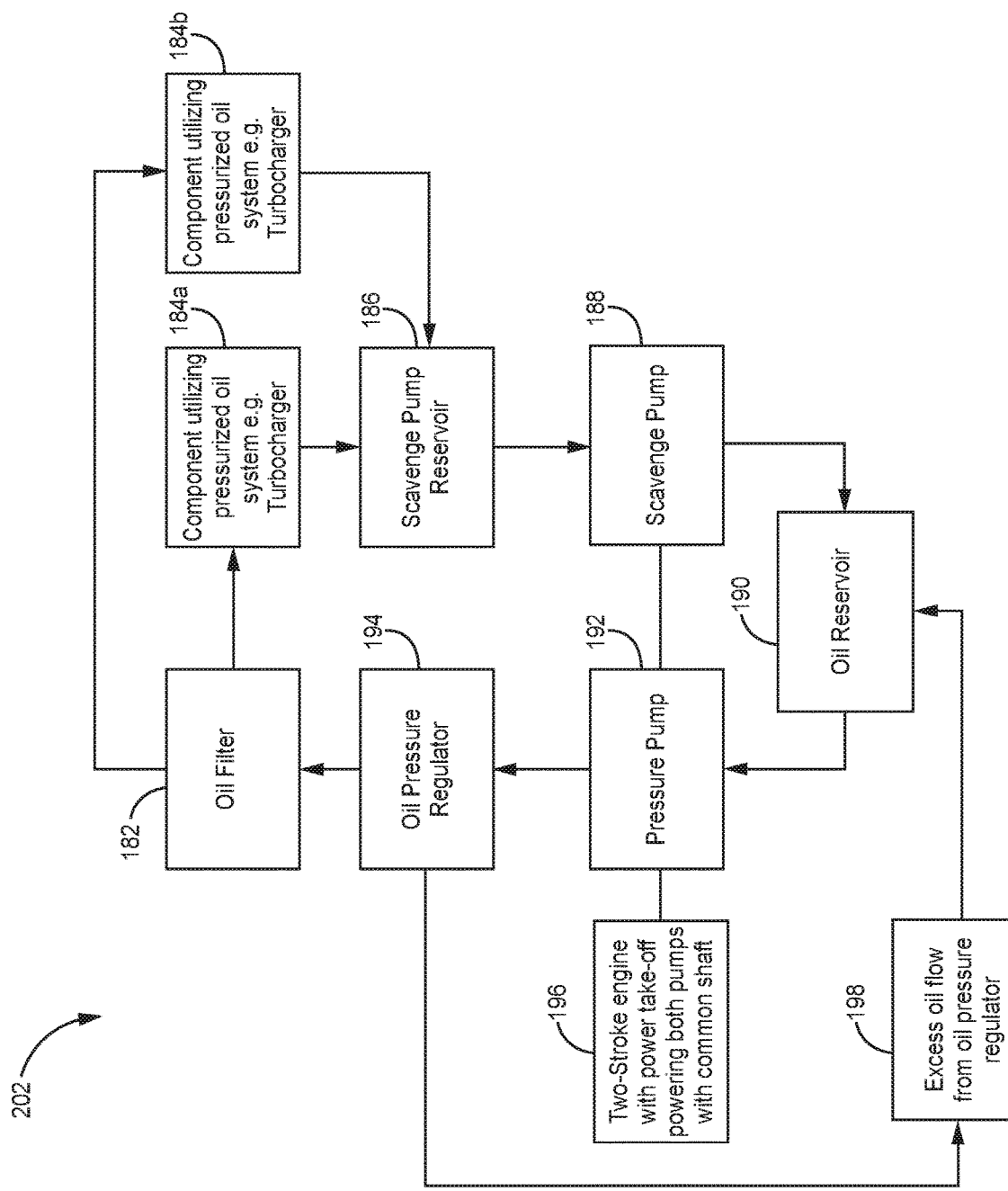

FIG. 16C illustrates a pressurized oiling system 202 that includes the same components described with respect to FIG. 16A. However, in the embodiment shown in FIG. 16C, instead of a single accessory, two or more accessories 184a and 184b are connected in parallel to receive pressurized oil. In particular, pressurized oil pumped from pressure pump 192 is provided to oil pressure regulator 194 and oil filter 182, wherein the first accessory 184a and the second accessory 184b are connected in a parallel configuration to receive pressurized oil from the oil pressure regulator 194 and oil filter 182. In one embodiment, pressurized oil provided to first and second accessories 184a and 184b is provided at a single pressure to both accessories. In some embodiments, however, oil can be provided at different pressures to first and second accessories 184a and 184b, for example via an additional pressure regulator or, in some embodiments, where the first and second accessories are in series. Oil collected from first and second accessories 184a and 184b are collected in scavenge pump reservoir 186, and pumped by scavenge pump 188 to oil reservoir 190.

Figure 16D:
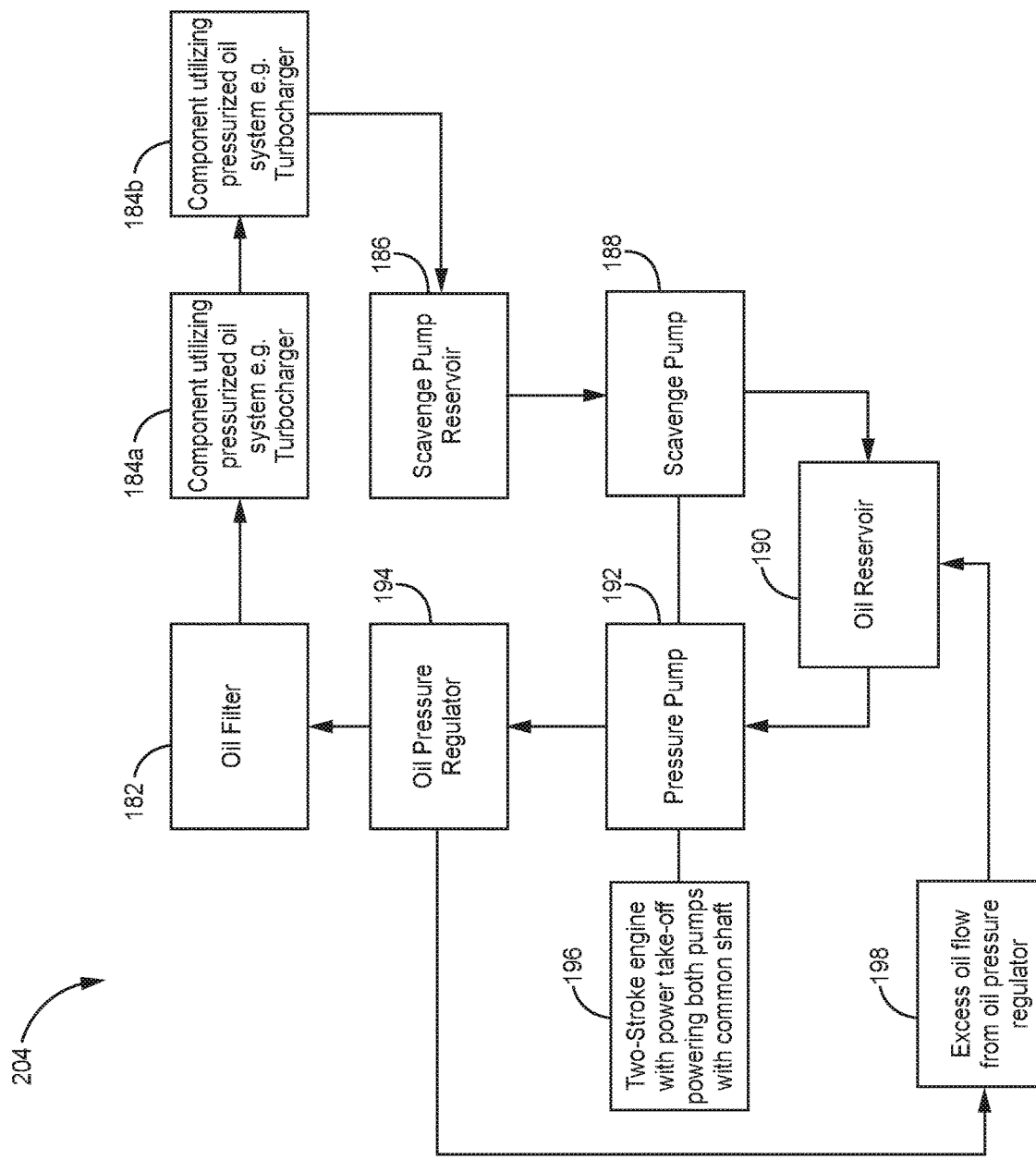

FIG. 16D illustrates a pressurized oiling system 204 that includes the same components described with respect to FIG. 16C. However, in the embodiment shown in FIG. 16D, first and second accessories 184a and 184b are connected in a serial configuration, rather than in the parallel configuration as shown in FIG. 16C. That is, pressurized oil from oil filter 182 is provided to first accessory 184a, and oil discharged from first accessory 184a is provided to second accessory 184b. Oil discharged from second accessory 184b is returned to scavenge pump reservoir 186, where it is pumped by scavenge pump 188 to oil reservoir 190. As a result of first and second accessories 184a and 184b being connected in series to receive pressurized oil, the oil pressure provided to accessory 184a may differ from the oil pressure provided to accessory 184b. In some embodiments, the accessory requiring higher pressure oil may be connected first in series to receive pressurized oil from oil filter 182.

Figure 16E:
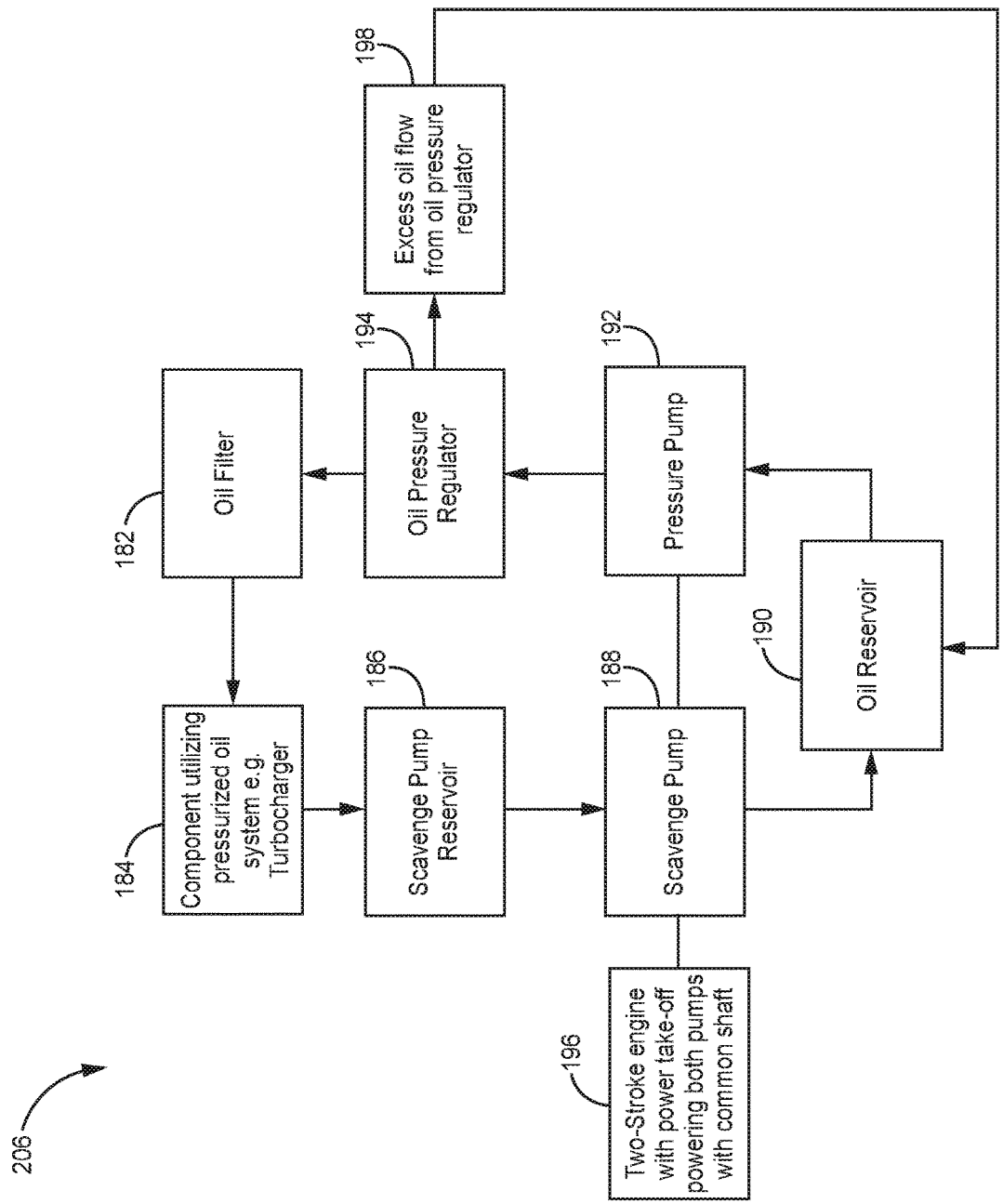

FIG. 16E illustrates a closed-loop oiling system 206 that includes the same components described with respect to FIG. 16A. However, in the embodiment shown in FIG. 16E, the position of scavenge pump 188 and pressure pump 192—relative to two-stroke engine 196—are exchanged. In particular, assuming scavenge pump 188 and pressure pump 192 are connected in a stacked configuration, scavenge pump 188 is located between two-stroke engine 196 and pressure pump 192. Depending on the physical size of scavenge pump 188 and pressure pump 192, it may be advantageous to locate either scavenge pump 188 or pressure pump 192 closer to two-stroke engine 196.

Figure 16F:
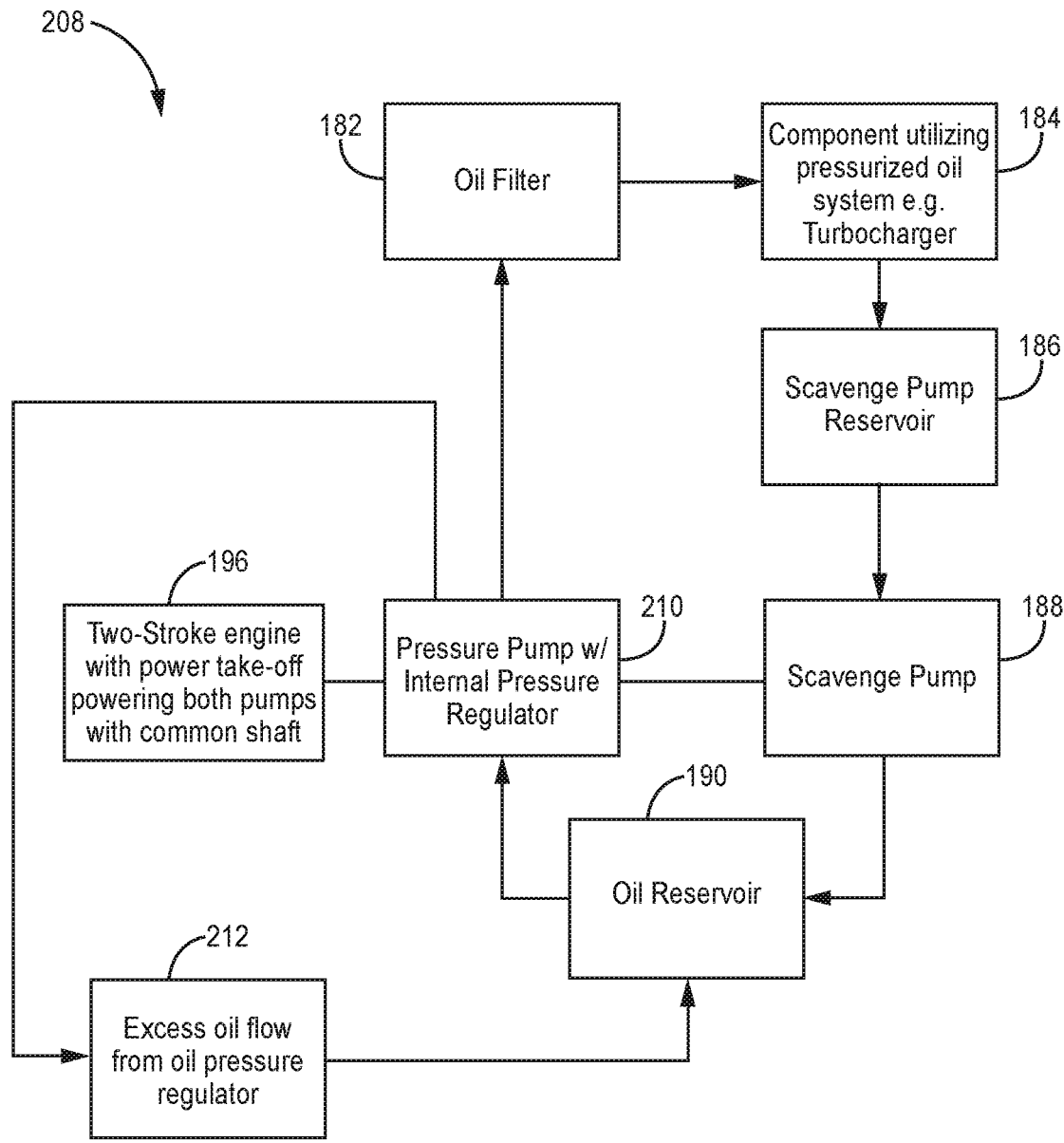

FIG. 16F illustrates a pressurized oiling system 208 that includes oil filter 182, accessory 184, scavenge pump reservoir 186, scavenge pump 188, oil reservoir 190, pressure pump 210 including an internal regulator, and two-stroke engine 196. In the embodiment shown in FIG. 16F, pressure pump 210 and scavenge pump 188 are mechanically coupled to two-stroke engine 196, for example via a common shaft driving both pumps. Mechanical power developed by two-stroke engine 196 is provided to pressure pump 210 and scavenge pump 188. For example, pressure pump 210 and scavenge pump 188 may be located adjacent one another in a stacked configuration, such as that shown in FIG. 15. Pressure pump 210 is fluidly connected to pump oil from oil reservoir 190 to accessory 184. In contrast with the embodiment shown in FIG. 16A, pressure pump 210 includes an internal oil pressure regulator that maintains the oil provided by the pump at a desired pressure. In the embodiment shown in FIG. 16F, if the pressure exceeds a desired pressure, excess oil is directed back to oil reservoir 190 via excess oil path 212. Oil filter 182 filters pressurized oil provided by oil pressure regulator 194, and provides filtered oil to accessory 184. For example, as discussed above, accessories requiring pressurized oil may include turbochargers, HPDI pressure pump assembly, etc. As provided above, accessories may include any devices requiring pressurized oil for lubrication. Pressurized oil provided to accessory 184 for lubrication is returned to scavenge pump reservoir 186. Scavenge pump 188 pumps oil collected in scavenge pump reservoir 186 to oil reservoir 190.

The oil distribution system described herein allows for the availability of pressurized oil to one or more accessories in a two-stroke engine environment. To provide pressurized oil, the system comprises a first oiling system and a second oiling system distinct from the first oiling system. The first oiling system may be a typical total-loss system that distributes oil from a first oil tank to the two-stroke engine at a first oil pressure. The second oiling system includes a pump mechanically coupled to the crankshaft of the two-stroke engine to distribute oil from a second oil tank to an accessory at a second oil pressure, wherein the second oil pressure is greater than the first oil pressure. In this way, the second oiling system powered by the two-stroke engine provides pressurized oil.

Although shown in relation to a snowmobile, the oiling systems, cooling systems, etc. described herein can also be used with ATVs, outboard engines, unmanned aerial vehicles, airplanes, personal watercraft, side-by-side off-road vehicles, etc.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A two-stroke engine comprising:
 a first oiling system that distributes oil from a first oil tank to the two-stroke engine at a first oil pressure;
 a first accessory; and a second oiling system that includes a pump mechanically coupled to a crankshaft of the two-stroke engine to distribute oil from a second oil tank to the first accessory at a second oil pressure greater than the first oil pressure, wherein oil distributed to the first accessory is returned to the second oil tank, wherein the second oiling system is a closed loop oiling system and is not in fluid communication with the first oiling system.

2. The two-stroke engine of claim 1, wherein the pump is a gerotor having an inlet port in fluid communication with the second oil tank and an outlet port in fluid communication with the first accessory.

3. The two-stroke engine of claim 1, wherein the second oiling system further includes a pressure regulator that regulates oil pressure provided to the first accessory.

4. The two-stroke engine of claim 1, further including:
a sump configured to collect oil from the first accessory; and
a scavenge pump that distributes oil from the sump to the second oil tank, wherein the scavenge pump is mechanically coupled to the crankshaft of the two-stroke engine.

5. The two-stroke engine of claim 4, wherein the scavenge pump and the pump are connected in a stack configuration along a single axis and coupled to the crankshaft of the two-stroke engine.

6. The two-stroke engine of claim 1, wherein the first accessory is a turbocharger coupled to provide compressed air to the two-stroke engine.

7. The two-stroke engine of claim 1, further including a second accessory, wherein pressurized oil is provided to the first accessory and to the second accessory in a parallel configuration.

8. The two-stroke engine of claim 1, further including a second accessory, wherein pressurized oil is provided to the first and second accessories in a serial configuration.

9. A two-stroke engine comprising:
a first oiling system that distributes oil from a first oil tank to the two-stroke engine at a first oil pressure;
a first accessory; and
a second oiling system that includes a pump mechanically coupled to a crankshaft of the two-stroke engine to distribute oil from a second oil tank to the first accessory at a second oil pressure greater than the first oil pressure, wherein oil distributed to the first accessory is returned to the second oil tank, wherein the first oiling system is a total loss oil distribution system.

10. A snow vehicle comprising:
an endless track;
a frame;
a transmission;
a two-stroke engine mechanically coupled to drive the endless track via the transmission,
wherein the two-stroke engine comprises:
a two-stroke engine oiling system that distributes oil from a first oil tank to the two-stroke engine at a first oil pressure;
an accessory; and
a pressurized oiling system that includes a pump mechanically coupled to a crankshaft of the two-stroke engine to distribute oil from a second oil tank to the accessory at a second oil pressure, wherein oil distributed to the accessory is returned to the second oil tank, wherein the pressurized oiling system is a closed loop system and is not in fluid communication with the two-stroke oiling system.

11. The snow vehicle of claim 10, wherein the second oil pressure is greater than the first oil pressure.

12. The snow vehicle of claim 10, wherein the pump is a gerotor having an inlet port in fluid communication with the second oil tank and an outlet port in fluid communication with the accessory.

13. The snow vehicle of claim 10, wherein the pressurized oiling system further includes a pressure regulator that regulates oil pressure provided to the accessory.

14. The snow vehicle of claim 10, further including:
a sump configured to collect oil from the accessory; and
a scavenge pump that distributes oil from the sump to the second oil tank, wherein the scavenge pump and the pump are mechanically coupled to the crankshaft in a stacked configuration along a single axis.

15. The snow vehicle of claim 10, wherein the accessory is a turbocharger coupled to provide compressed air to the two-stroke engine.

16. A snowmobile comprising:
an endless track;
a frame;
a transmission;
a two-stroke engine mechanically coupled to drive the endless track via the transmission,
wherein the two-stroke engine comprises:
an open-loop oiling system that distributes oil from a first oil tank to the two-stroke engine at a first oil pressure;
an accessory; and
a closed loop oiling system that includes a pump mechanically coupled to a crankshaft of the two-stroke engine to distribute oil from a second oil tank to the accessory at a second oil pressure, wherein oil distributed to the accessory is returned to the second oil tank.

17. The snowmobile of claim 16, wherein the second oil pressure is greater than the first oil pressure.

18. The snowmobile of claim 16, wherein the closed loop oiling system further includes:
a sump configured to collect oil from the accessory; and
a scavenge pump that distributes oil from the sump to the second oil tank, wherein the scavenge pump and the pump are mechanically coupled to the crankshaft in a stacked configuration along a single axis.

19. The snowmobile of claim 16, further including:
an intercooler connected to receive compressed air from the accessory, wherein the intercooler cools a temperature of the compressed air and provides cooled, compressed air to cylinders in the two-stroke engine for combustion.

20. The snowmobile of claim 19, further comprising a cooling circuit that includes a heat exchanger and a coolant pump to circulate coolant through the cooling circuit, wherein the cooling circuit circulates coolant from the heat exchanger to the intercooler, from the intercooler to the two-stroke engine, and from the two-stroke engine to the heat exchanger.

* * * * *